US012562977B2

(12) United States Patent
Chen

(10) Patent No.: US 12,562,977 B2
(45) Date of Patent: Feb. 24, 2026

(54) FRAMEWORK FOR BIER FAST REROUTE

(71) Applicant: Huawei Technologies Co., Ltd.,
Shenzhen (CN)

(72) Inventor: Huaimo Chen, Bolton, MA (US)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 102 days.

(21) Appl. No.: 18/391,242

(22) Filed: Dec. 20, 2023

(65) Prior Publication Data

US 2024/0163202 A1    May 16, 2024

Related U.S. Application Data

(63) Continuation of application No.
PCT/US2022/036248, filed on Jul. 6, 2022.

(60) Provisional application No. 63/218,810, filed on Jul.
6, 2021.

(51) Int. Cl.
H04L 45/00 (2022.01)
H04L 45/02 (2022.01)
H04L 45/28 (2022.01)

(52) U.S. Cl.
CPC .............. H04L 45/22 (2013.01); H04L 45/02
(2013.01); H04L 45/28 (2013.01)

(58) Field of Classification Search
CPC ......... H04L 45/22; H04L 45/02; H04L 45/28;
H04L 41/0668; H04L 45/16
See application file for complete search history.

(56) References Cited

U.S. PATENT DOCUMENTS

2015/0138961 A1* 5/2015 Wijnands ............ H04L 12/1863
370/228
2024/0243990 A1* 7/2024 Ye ........................... H04L 45/03

OTHER PUBLICATIONS

Chen, "BIER Fast ReRoute draft-chen-bier-frr-03", Jul. 2, 2021
(Year: 2022).*
X. Wu, X. Gong, Q. Wu, X. Que and Y. Tian, "Hierarchical
Forwarding Bit Index Explicit Replication (HF-BIER) in Multi-
cast," 2019 IEEE 8th Joint International Information Technology
and Artificial Intelligence Conference (ITAIC), Chongqing, China,
2019, pp. 275-279, doi: 10.1109/ITAIC.2019.8785562. (Year: 2019).*
J. Papán, P. Segeč, M. Moravčík, M. Kontek, L. Mikuš and J.
Uramová, "Overview of IP Fast Reroute Solutions," 2018 16th
International Conference on Emerging eLearning Technologies and
Applications (ICETA), Stary Smokovec, Slovakia, 2018, pp. 417-
424, doi: 10.1109/ICETA.2018.8572205. (Year: 2018).*

(Continued)

*Primary Examiner* — Messeret F Gebre
(74) *Attorney, Agent, or Firm* — Conley Rose, P.C.

(57) ABSTRACT

A method implemented by a network node in a BIER
domain includes obtaining, by a control plane of the network
node, an IP LFA from a FIB or RIB through a first interface,
using, by the control plane of the network node, the IP LFA
to build a BIFTe when the IP LFA is an expected type,
accessing, by the control plane of the network node, a BIER
network topology in an LSDB through a second interface,
computing an LFA of the expected type, and using the LFA
to build the BIFTe when the IP LFA is not of the expected
type, updating, by the control plane of the network node, the
BIFTe in a data plane of the network node through a third
interface; and forwarding, by the data plane of the network
node, BIER packets using the BIFTe to avoid a failure.

24 Claims, 14 Drawing Sheets

(56) References Cited

OTHER PUBLICATIONS

Litkowski, S., et al., "Topology Independent Fast Reroute using Segment Routing," draft-ietf-rtgwg-segment-routing-ti-lfa-06, Network Working Group, Feb. 1, 2021, 48 pages.

Wijnands, IJ., Ed., et al., Multicast Using Bit Index Explicit Replication (BIER), Internet Engineering Task Force (IETF), RFC 8279, Nov. 2017, 43 pages.

Litkowski, S., et al., "Topology Independent Fast Reroute using Segment Routing," draft-ietf-rtgwg-segment-routing-ti-lfa-07, Network Working Group, Jun. 29, 2021, 45 pages.

Chen, H., et al., "BIER Egress Protection," draft-chen-bier-egress-protect-01, Network Working Group, Feb. 21, 2021, 39 pages.

Leiba, B., "Ambiguity of Uppercase vs Lowercase in RFC 2119 Key Words," Internet Engineering Task Force (IETF), RFC 8174, May 2017, 4 pages.

Merling, D., et al., "BIER Fast Reroute," draft-merling-bier-frr-00, BIER Working Group, Mar. 5, 2019, 28 pages.

Bradner, S., "Key words for use in RFCs to Indicate Requirement Levels," Network Working Group, RFC 2119, Mar. 1997, 3 pages.

Atlas, A., Ed., et al., "Basic Specification for IP Fast Reroute: Loop-Free Alternates," Network Working Group, RFC 5286, Sep. 2008, 31 pages.

Bryant, S., et al., "Remote Loop-Free Alternate (LFA) Fast Reroute (FRR)," Internet Engineering Task Force (IETF), RFC 7490, Apr. 2015, 29 pages.

Chen H et al: "BIER Fast ReRoute draft-chen-bier-frr-03; draft-chen-bier-frr-03.txt", BIER Fast Reroute draft-chen-bier-frr-03; draft-chen-bier-frr-03. txt; Internet-Draft: Network Working Group, Internet Engineering Task Force, IETF; StandardWorkingDraft, Internet Society (ISOC) 4,. RUE No. 3, Jul. 2, 2021 (Jul. 2, 2021), XP015146566, total 18 pages.

* cited by examiner

200

| | 202 | 204 | 206 |
|---|---|---|---|
| | BFR-id (SI:BitString) | F-BM | BFR-NBR (Next Hop) |
| 208 | 1 (0:00001) | 01011 | C |
| 210 | 2 (0:00010) | 01011 | C |
| 212 | 3 (0:00100) | 00100 | E |
| 214 | 4 (0:01000) | 01011 | C |
| 216 | 5 (0:10000) | 10000 | A |

| BFR-id (SI:BitString) | F-BM/BF-FM | BFR-NBR/BBFR-NBR (NH/BNH) | BN-Type |
|---|---|---|---|
| 1 (0:00001) | 01001 | G | TI, Path to G |
| 2 (0:00010) | 00110 | E | Normal |
| 3 (0:00100) | 00110 | E | |
| 4 (0:01000) | 01001 | G | TI, Path to G |
| 5 (0:10000) | 10000 | A | |

| | 602 | 604 | 606 | 608 | 610 | 612 | 614 |
|---|---|---|---|---|---|---|---|
| | BFR-id (SI:BitString) | F-BM | BFR-NBR (NH) | BA | BF-BM | BBFR-NBR (BNH) | BN-Type |
| 616 | 1 (0:00001) | 01011 | C | | 01001 | G | TI, Path to G |
| 618 | 2 (0:00010) | 01011 | C | | 00110 | E | Normal |
| 620 | 3 (0:00100) | 00100 | E | | 10100 | A | Normal |
| 622 | 4 (0:01000) | 01011 | C | | 01001 | G | TI, Path to G |
| 624 | 5 (0:10000) | 10000 | A | | 10000 | G | Normal |

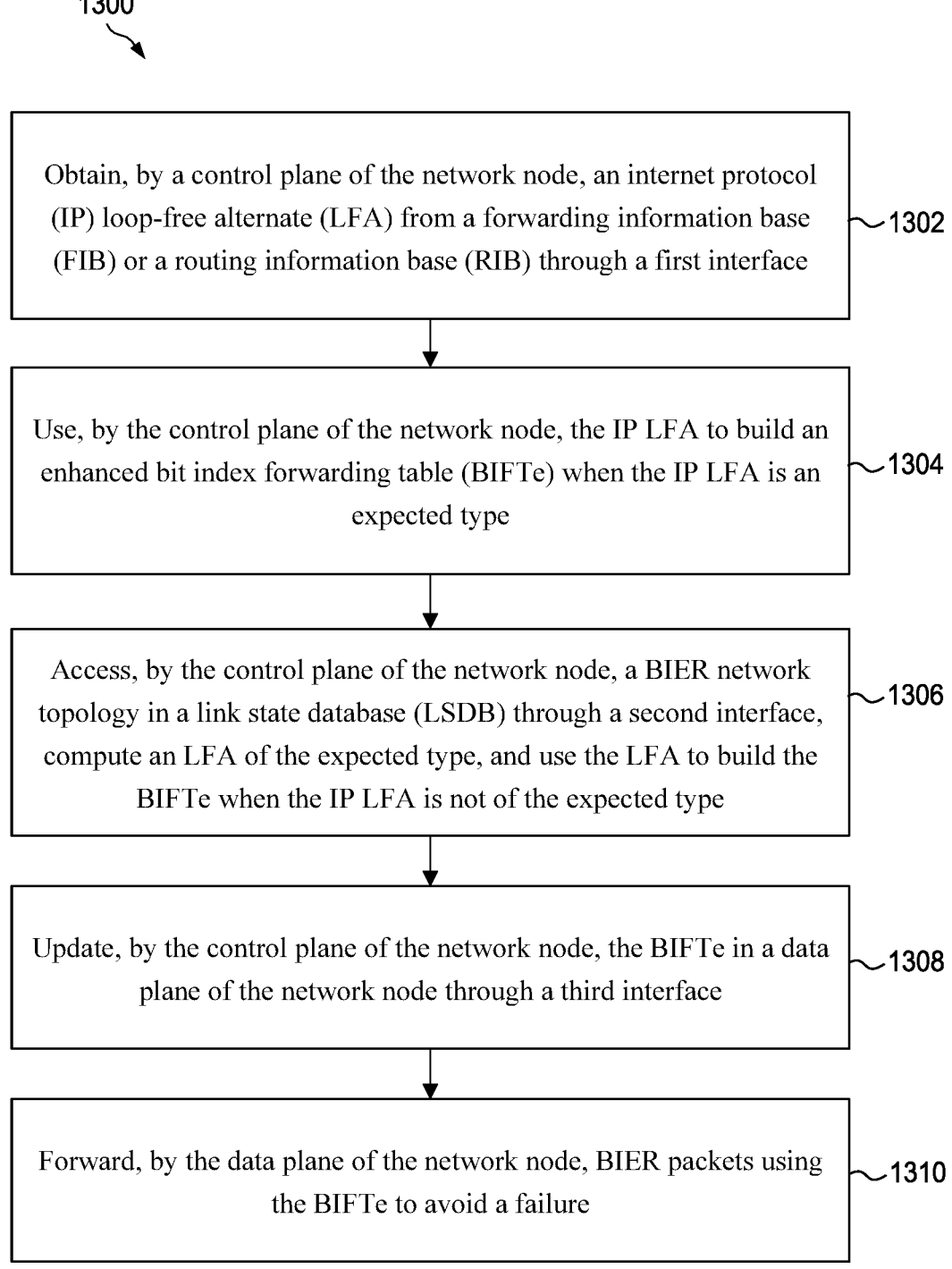

Obtain, by a control plane of the network node, an internet protocol (IP) loop-free alternate (LFA) from a forwarding information base (FIB) or a routing information base (RIB) through a first interface          ⌐∼1302

Use, by the control plane of the network node, the IP LFA to build an enhanced bit index forwarding table (BIFTe) when the IP LFA is an expected type          ⌐∼1304

Access, by the control plane of the network node, a BIER network topology in a link state database (LSDB) through a second interface, compute an LFA of the expected type, and use the LFA to build the BIFTe when the IP LFA is not of the expected type          ⌐∼1306

Update, by the control plane of the network node, the BIFTe in a data plane of the network node through a third interface          ⌐∼1308

Forward, by the data plane of the network node, BIER packets using the BIFTe to avoid a failure          ⌐∼1310

FIG. 13

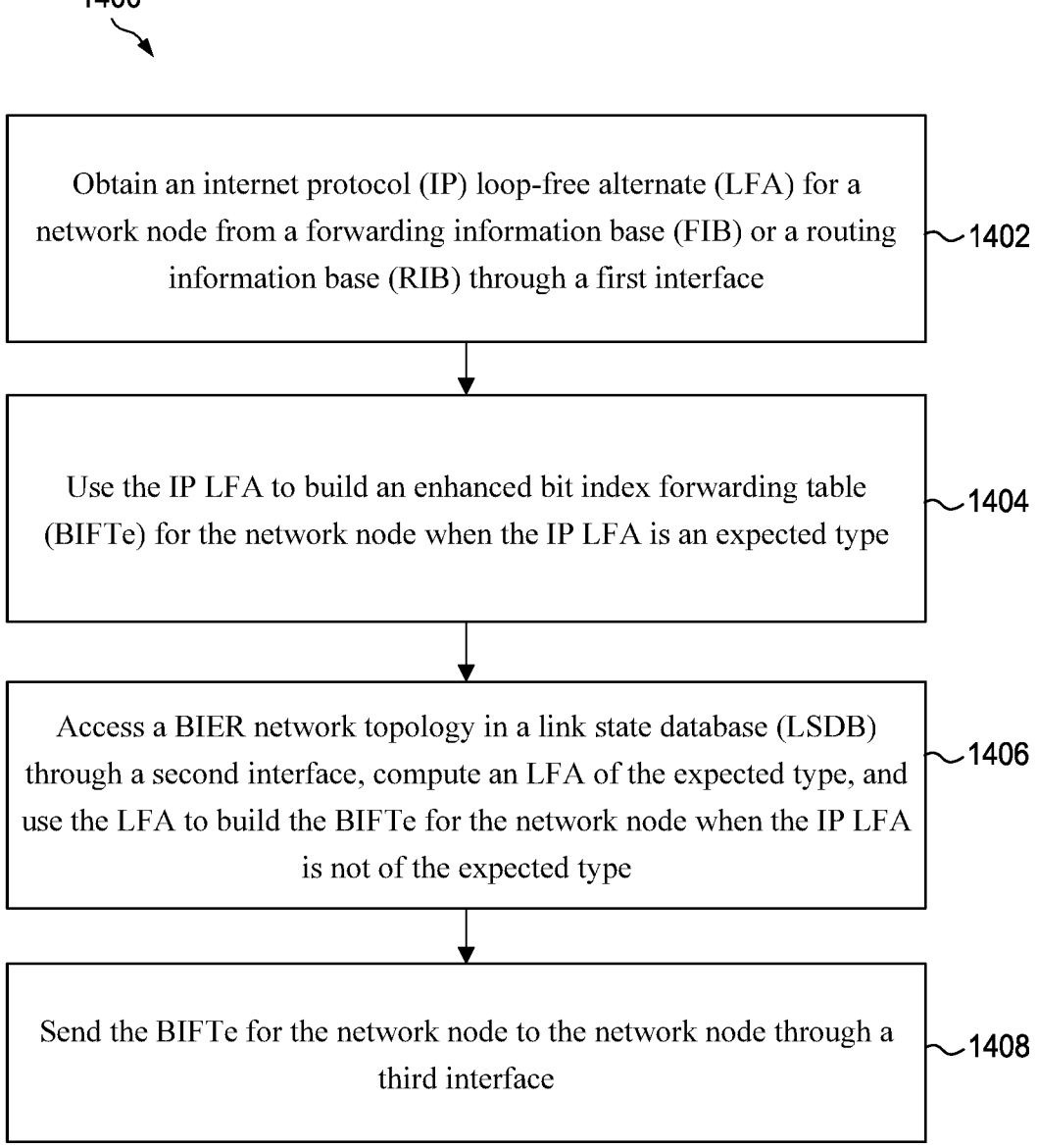

1400

Obtain an internet protocol (IP) loop-free alternate (LFA) for a network node from a forwarding information base (FIB) or a routing information base (RIB) through a first interface ~1402

Use the IP LFA to build an enhanced bit index forwarding table (BIFTe) for the network node when the IP LFA is an expected type ~1404

Access a BIER network topology in a link state database (LSDB) through a second interface, compute an LFA of the expected type, and use the LFA to build the BIFTe for the network node when the IP LFA is not of the expected type ~1406

Send the BIFTe for the network node to the network node through a third interface ~1408

FIG. 14

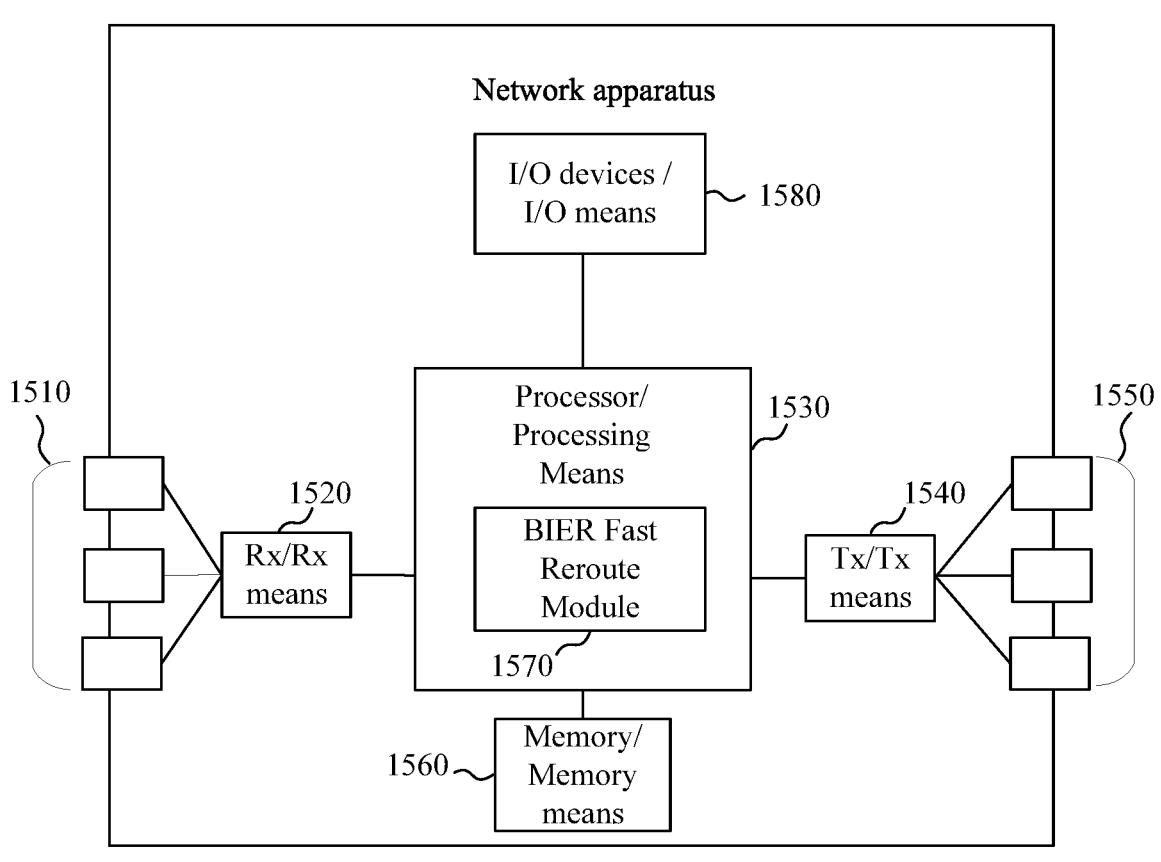
FIG. 15

FRAMEWORK FOR BIER FAST REROUTE

CROSS-REFERENCE TO RELATED APPLICATIONS

This patent application is a continuation of International Application No. PCT/US2022/036248 filed on Jul. 6, 2022, which claims the benefit of U.S. Provisional Patent Application No. 63/218,810 filed Jul. 6, 2021 by Futurewei Technologies, Inc., and titled "Framework for BIER Fast ReRoute," each of which is hereby incorporated by reference.

TECHNICAL FIELD

The present disclosure is generally related to the field of fast re-route (FRR) protection and, in particular, to FRR protection against the failure of a node in a Bit Index Explicit Replication (BIER) domain.

BACKGROUND

BIER mechanisms provide optimized forwarding of multicast data packets through a BIER domain BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by U. Wijnands, et al., published November 2017.

SUMMARY

The disclosed aspects/embodiments provide architectures for supporting BIER-FRR. Each architecture is configured to build a bit index forwarding table (BIFT) that has been enhanced for BIER-FRR. The BIFT that has been enhanced for BIER-FRR is referred to as an enhanced BIFT, an extended BIFT, or a BIFTe. The enhanced BIFT, or BIFTe, provides fast rerouting when network failures (e.g., the failure of a network node or link) are encountered. Thus, packet routing within the BIER domain is improved.

A first aspect relates to a method implemented by a network node in a Bit Index Explicit Replication (BIER) domain, comprising: obtaining, by a control plane of the network node, an internet protocol (IP) loop-free alternate (LFA) from a forwarding information base (FIB) or a routing information base (RIB) through a first interface; using, by the control plane of the network node, the IP LFA to build an enhanced bit index forwarding table (BIFTe) when the IP LFA is an expected type; accessing, by the control plane of the network node, a BIER network topology in a link state database (LSDB) through a second interface, computing an LFA of the expected type, and using the LFA to build the BIFTe when the IP LFA is not of the expected type; updating, by the control plane of the network node, the BIFTe in a data plane of the network node through a third interface; and forwarding, by the data plane of the network node, BIER packets using the BIFTe to avoid a failure.

Optionally, in any of the preceding aspects, another implementation of the aspect provides that the network node comprises a bit forwarding router (BFR) or a bit forwarding egress router (BFER).

Optionally, in any of the preceding aspects, another implementation of the aspect provides that the failure comprises a neighbor network node failure in the BIER domain.

Optionally, in any of the preceding aspects, another implementation of the aspect provides that the IP-LFA is based on an IP network, and wherein the LFA is based on the BIER network topology.

Optionally, in any of the preceding aspects, another implementation of the aspect provides that the BIER packets are forwarded to a backup network node neighbor of the network node using the BIFTe.

Optionally, in any of the preceding aspects, another implementation of the aspect provides that the expected type comprises a basic LFA or a topology independent (TI) LFA.

A second aspect relates to a network node in a Bit Index Explicit Replication (BIER) domain, comprising: a memory storing instructions; and a processor coupled to the memory, the processor configured to execute the instructions to cause the network node to: obtain, by a control plane of the network node, an internet protocol (IP) loop-free alternate (LFA) from a forwarding information base (FIB) or a routing information base (RIB) through a first interface; use, by the control plane of the network node, the IP LFA to build an enhanced bit index forwarding table (BIFTe) when the IP LFA is an expected type; access, by the control plane of the network node, a BIER network topology in a link state database (LSDB) through a second interface, compute an LFA of the expected type, and use the LFA to build the BIFTe when the IP LFA is not of the expected type; update, by the control plane of the network node, the BIFTe in a data plane of the network node; and forward, by the data plane of the network node, BIER packets using the BIFTe to avoid a failure.

Optionally, in any of the preceding aspects, another implementation of the aspect provides that the network node comprises a bit forwarding router (BFR) or a bit forwarding egress router (BFER).

Optionally, in any of the preceding aspects, another implementation of the aspect provides that the failure comprises a neighbor network node failure in the BIER domain.

Optionally, in any of the preceding aspects, another implementation of the aspect provides that the failure comprises a link failure in the BIER domain.

Optionally, in any of the preceding aspects, another implementation of the aspect provides that the IP-LFA is based on an IP network, and wherein the LFA is based on the BIER network topology.

Optionally, in any of the preceding aspects, another implementation of the aspect provides that the BIER packets are forwarded to a backup network node neighbor of the network node using the BIFTe.

Optionally, in any of the preceding aspects, another implementation of the aspect provides that the expected type comprises a basic LFA or a topology independent (TI) LFA.

A third aspect relates to a method implemented by a controller of a Bit Index Explicit Replication (BIER) domain, comprising: obtaining an internet protocol (IP) loop-free alternate (LFA) for a network node from a forwarding information base (FIB) or a routing information base (RIB) through a first interface; using the IP LFA to build an enhanced bit index forwarding table (BIFTe) for the network node when the IP LFA is an expected type; accessing a BIER network topology in a link state database (LSDB) through a second interface, computing an LFA of the expected type, and using the LFA to build the BIFTe for the network node when the IP LFA is not of the expected type; and sending the BIFTe for the network node to the network node through a third interface.

Optionally, in any of the preceding aspects, another implementation of the aspect provides that the network node comprises a bit forwarding router (BFR) or a bit forwarding egress router (BFER).

Optionally, in any of the preceding aspects, another implementation of the aspect provides that the method is performed for every network node in the BIER domain.

Optionally, in any of the preceding aspects, another implementation of the aspect provides that the IP-LFA is based on an IP network, and wherein the LFA is based on the BIER network topology.

Optionally, in any of the preceding aspects, another implementation of the aspect provides that the expected type comprises a basic LFA or a topology independent (TI) LFA.

Optionally, in any of the preceding aspects, another implementation of the aspect provides that the BIFTe is sent to a control plane of the network node in a message comprising a Type-Length-Value (TLV).

Optionally, in any of the preceding aspects, another implementation of the aspect provides that the TLV comprises a protection type, a bit forwarding router neighbor (BFR-NBR) of the network node, and a forwarding entry for each bit forwarding egress router (BFER) for forwarding a packet to avoid a failure of the BFR-NBR, and wherein the forwarding entry comprises a BFR identifier (BFR-id) of the BFER, a forwarding bit mask (F-BM), a backup BFR-NBR (BBFR-NBR), a BBFR-NBR Type (BN-Type), and a backup path when the BN-Type is the TI-LFA.

Optionally, in any of the preceding aspects, another implementation of the aspect provides that the protection type has a value of one (1) to indicate node protection, and wherein the forwarding entry is used to forward the packet to avoid a failure of the BFR-NBR.

Optionally, in any of the preceding aspects, another implementation of the aspect provides that the protection type has a value of two (2) to indicate link protection, and wherein the forwarding entry is for forwarding the packet to avoid a failure of a link to the BFR-NBR.

Optionally, in any of the preceding aspects, another implementation of the aspect provides that the TLV comprises a protection type and a forwarding entry for each bit forwarding egress router (BFER), and wherein the forwarding entry comprises a BFR identifier (BFR-id) of the BFER, a forwarding bit mask (F-BM), a BFR-NBR, a backup forwarding bit mask (BF-BM), a backup BFR-NBR (BBFR-NBR), a BBFR-NBR Type (BN-Type), and a backup path when the BN-Type is the TI-LFA.

Optionally, in any of the preceding aspects, another implementation of the aspect provides that the protection type has a value of one (1) indicating node protection, and wherein the BFR-id of the BFER, a bit forwarding router neighbor (BFR-NBR) of the network node, the BF-BM, the BBFR-NBR, the BN-Type, and a backup path in the forwarding entry are used to forward the packet to avoid failure of the BFR-NBR.

Optionally, in any of the preceding aspects, another implementation of the aspect provides that the protection type has a value of two (2) indicating link protection, and wherein the BFR-id of the BFER, a bit forwarding router neighbor (BFR-NBR) of the network node (BFR-NBR), the BF-BM, the BBFR-NBR, the BN-Type, and a backup path in the forwarding entry are used to forward a packet to avoid a failure of a link to the BFR-NBR.

A fourth aspect relates to a controller of a Bit Index Explicit Replication (BIER) domain, comprising: a memory storing instructions; and a processor coupled to the memory, the processor configured to execute the instructions to cause the controller to: obtain an internet protocol (IP) loop-free alternate (LFA) for a network node from a forwarding information base (FIB) or a routing information base (RIB) through a first interface; use the IP LFA to build an enhanced bit index forwarding table (BIFTe) for the network node when the IP LFA is an expected type; access a BIER network topology in a link state database (LSDB) through a second interface, compute an LFA of the expected type, and use the LFA to build the BIFTe for the network node when the IP LFA is not of the expected type; and send the BIFTe for the network node to the network node through a third interface.

Optionally, in any of the preceding aspects, another implementation of the aspect provides that the network node comprises a bit forwarding router (BFR) or a bit forwarding egress router (BFER).

Optionally, in any of the preceding aspects, another implementation of the aspect provides that the method is performed for every network node in the BIER domain.

Optionally, in any of the preceding aspects, another implementation of the aspect provides that the IP-LFA is based on an IP network, and wherein the LFA is based on the BIER network topology.

Optionally, in any of the preceding aspects, another implementation of the aspect provides that the expected type comprises a basic LFA or a topology independent (TI) LFA.

Optionally, in any of the preceding aspects, another implementation of the aspect provides that the BIFTe is sent to a control plane of the network node in a message comprising a Type-Length-Value (TLV).

Optionally, in any of the preceding aspects, another implementation of the aspect provides that the TLV comprises a protection type, a bit forwarding router neighbor (BFR-NBR) of the network node, and a forwarding entry for each bit forwarding egress router (BFER) for forwarding a packet to avoid a failure of the BFR-NBR, and wherein the forwarding entry comprises a BFR identifier (BFR-id) of the BFER, a forwarding bit mask (F-BM), a backup BFR-NBR (BBFR-NBR), a BBFR-NBR Type (BN-Type), and a backup path when the BN-Type is the TI-LFA.

Optionally, in any of the preceding aspects, another implementation of the aspect provides that the protection type has a value of one (1) to indicate node protection, and wherein the forwarding entry is used to forward the packet to avoid a failure of the BFR-NBR.

Optionally, in any of the preceding aspects, another implementation of the aspect provides that the protection type has a value of two (2) to indicate link protection, and wherein the forwarding entry is for forwarding the packet to avoid a failure of a link to the BFR-NBR.

Optionally, in any of the preceding aspects, another implementation of the aspect provides that the TLV comprises a protection type and a forwarding entry for each bit forwarding egress router (BFER), and wherein the forwarding entry comprises a BFR identifier (BFR-id) of the BFER, a forwarding bit mask (F-BM), a BFR-NBR, a backup forwarding bit mask (BF-BM), a backup BFR-NBR (BBFR-NBR), a BBFR-NBR Type (BN-Type), and a backup path when the BN-Type is the TI-LFA.

Optionally, in any of the preceding aspects, another implementation of the aspect provides that the protection type has a value of one (1) indicating node protection, and wherein the BFR-id of the BFER, a bit forwarding router neighbor (BFR-NBR) of the network node, the BF-BM, the BBFR-NBR, the BN-Type, and a backup path in the forwarding entry are used to forward the packet to avoid failure of the BFR-NBR.

Optionally, in any of the preceding aspects, another implementation of the aspect provides that the protection type has a value of two (2) indicating link protection, and wherein the BFR-id of the BFER, a bit forwarding router neighbor (BFR-NBR) of the network node (BFR-NBR), the BF-BM, the BBFR-NBR, the BN-Type, and a backup path in the forwarding entry are used to forward a packet to avoid a failure of a link to the BFR-NBR.

A fifth aspect relates to a network node in a Bit Index Explicit Replication (BIER) domain, comprising: means for obtaining, by a control plane of the network node, an internet protocol (IP) loop-free alternate (LFA) from a forwarding information base (FIB) or a routing information base (RIB) through a first interface; means for using, by the control plane of the network node, the IP LFA to build an enhanced bit index forwarding table (BIFTe) when the IP LFA is an expected type; means for accessing, by the control plane of the network node, a BIER network topology in a link state database (LSDB) through a second interface, computing an LFA of the expected type, and using the LFA to build the BIFTe when the IP LFA is not of the expected type; means for updating, by the control plane of the network node, the BIFTe in a data plane of the network node through a third interface; and means for forwarding, by the data plane of the network node, BIER packets using the BIFTe to avoid a failure.

A sixth aspect relates to a controller of a Bit Index Explicit Replication (BIER) domain, comprising: means for obtaining an internet protocol (IP) loop-free alternate (LFA) for a network node from a forwarding information base (FIB) or a routing information base (RIB) through a first interface; means for using the IP LFA to build an enhanced bit index forwarding table (BIFTe) for the network node when the IP LFA is an expected type; means for accessing a BIER network topology in a link state database (LSDB) through a second interface, computing an LFA of the expected type, and using the LFA to build the BIFTe for the network node when the IP LFA is not of the expected type; and sending the BIFTe for the network node to the network node through a third interface.

A seventh aspect relates to a non-transitory computer readable medium comprising a computer program product for use by a network node in a Bit Index Explicit Replication (BIER) domain, the computer program product comprising computer executable instructions stored on the non-transitory computer readable medium that, when executed by one or more processors, cause the network node to execute the method in any of the disclosed embodiments.

An eighth aspect relates to a non-transitory computer readable medium comprising a computer program product for use by a controller of a Bit Index Explicit Replication (BIER) domain, the computer program product comprising computer executable instructions stored on the non-transitory computer readable medium that, when executed by one or more processors, cause the controller to execute the method in any of the disclosed embodiments.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram of a bit index routing table (BIFT) of a network node.

FIG. 5 is a schematic diagram of a FRR BIFT of a network node according to an embodiment of the disclosure.

FIG. 6 is a schematic diagram of an integrated BIFT of a network node according to an embodiment of the disclosure.

FIG. 13 is a method implemented by a network node in the BIER domain according to an embodiment of the disclosure.

FIG. 14 is a method implemented by a controller of the BIER domain according to an embodiment of the disclosure.

FIG. 15 is a schematic diagram of a network apparatus according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While there is an architecture for supporting BIER, there is currently no architecture for supporting BIER fast re-route (BIER-FRR). As used herein, fast re-route may also be designated fast reroute, fast re-route, fast ReRoute, and so on.

Disclosed herein are architectures for supporting BIER-FRR. Each architecture is configured to build a bit index forwarding table (BIFT) that has been enhanced for BIER-FRR. The BIFT that has been enhanced for BIER-FRR is referred to as an enhanced BIFT, an extended BIFT, or a BIFTe. The enhanced BIFT, or BIFTe, provides fast rerouting when network failures (e.g., the failure of a network node or link) are encountered. Thus, packet routing within the BIER domain is improved.

Figure 1:
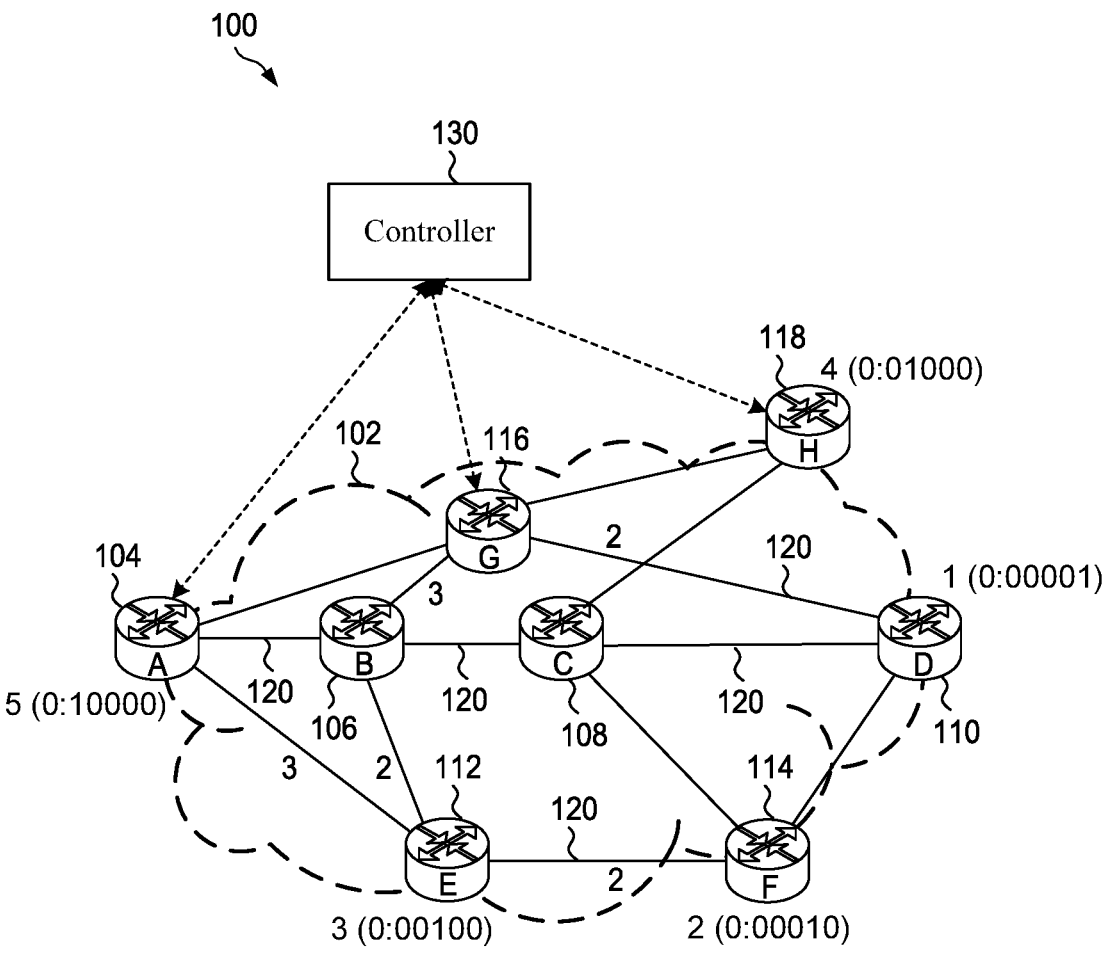
FIG. 1 is a schematic diagram of a BIER topology including a BIER domain.

FIG. 1 is a schematic diagram of a BIER topology 100 including a BIER domain 102. The BIER domain 102 may be part of a larger BIER domain (not shown). As such, the BIER domain 102 may be referred to herein as a BIER sub-domain. The BIER domain 102 comprises a plurality of network nodes 104, 106, 108, 110, 112, 114, 116, and 118. While eight network nodes 104-118 are shown in the BIER domain 102, more or fewer nodes may be included in practical applications.

For ease of discussion, all of the network nodes 104-118 have been given a letter designation. For example, the network node 104 has the designation A, the network node 106 has the designation B, the network node 108 has the designation C, the network node 110 has the designation D, the network node 112 has the designation E, the network node 114 has the designation F, the network node 116 has the designation G, and the network node 118 has the designation H.

Each of the network nodes 104-118 is a bit forwarding router (BFR). Some of the network nodes, namely the network nodes 104, 110, 112, 114 and 118, are disposed at an edge of the BIER domain 102. The network nodes 104, 110, 112, 114 and 118 receiving multicast packets from outside the BIER domain 102 may be referred to as an ingress BFR (BFIR). The network nodes 104, 110, 112, 114 and 118 transmitting multicast packets out of the BIER domain 102 may be referred to as an egress BFR (BFER). Depending on the direction of multicast packet traffic, each of the network nodes 104-118 may function as a BFIR or a BFER.

Each of the network nodes 104, 110, 112, 114 and 118 may be referred to herein as a destination network node. The network nodes 104, 110, 112, 114 and 118 have each been assigned a BFR identifier (BFR-id), a set index (SI), and a bitstring. For example, the network node 110 has a BFR-id of 1, has a SI of 0, and has a bitstring of 00001 (collectively illustrated as 1 (0:00001) in FIG. 1). The network node 114 has a BFR-id of 2, has a SI of 0, and has a bitstring of 00010 (collectively illustrated as 2 (0:00010)). The network node 112 has a BFR-id of 3, has a SI of 0, and has a bitstring of 00100 (collectively illustrated as 3 (0:00100)). The network node 118 has a BFR-id of 4, has a SI of 0, and has a bitstring of 01000 (collectively illustrated as 4 (0:01000)). The network node 104 has a BFR-id of 5, has a SI of 0, and has a bitstring of 10000 (collectively illustrated as 5 (0:10000)).

Each of the network nodes 104-118 has one or more neighbor nodes. As used herein, a neighbor node refers to a network node that is only one hop away from the network node. For example, network node 106 has four neighbor nodes in FIG. 1, namely network node 104, network node 108, network node 112, and network node 116. Indeed, each of network node 104, network node 108, network node 112, and network node 116 are only one hop away from network node 106.

The network nodes 104-118 in FIG. 1 are coupled to, and communicate with each other, via links 120. The links 120 may be wired, wireless, or some combination thereof. Each of the links 120 have a cost. For example, the cost of the link between network node 106 and network node 112 is 2 as shown in FIG. 1. Likewise, the cost of the link between network node 106 and network node 116 is 3, the cost of the link between network node 104 and network node 112 is also 3, the cost of the link between network node 112 and network node 114 is 2 and the cost of the link between network node 116 and network node 110 is also 2. For any link 120 in FIG. 1 not showing a numerical value next to the link, the default cost is 1. For example, the cost of the link between network node 106 and network node 104 is 1.

In an embodiment, the BIER domain 102 may be controlled by a network controller 130 (a.k.a., BIER controller, controller) capable of implementing a routing protocol such as, for example, a Path Computation Element Protocol (PCEP), border gateway protocol (BGP), or Intermediate-System Intermediate System (IS-IS). PCEP is a special set of rules that allows a Path Computation Client (PCC) to request path computations from Path Computation Elements (PCEs). The protocol also lets the PCEs return responses. BGP is a standardized exterior gateway protocol designed to exchange routing and reachability information among autonomous systems (AS) on the Internet. BGP is classified as a path-vector routing protocol, and BGP makes routing decisions based on paths, network policies, or rule-sets configured by a network administrator. IS-IS (also written ISIS) is a routing protocol designed to move information efficiently within a computer network, a group of physically connected computers, or similar devices. IS-IS accomplishes this by determining the best route for data through a packet switching network.

In an embodiment, one or more of the network nodes 104-118 may request that the network controller 130 calculate the BIER path through the BIER domain 102. Once calculated, the BIER-TE path may be distributed to one or more of the network nodes 104-118 by the network controller 130.

FIG. 2 is a schematic diagram of a bit index forwarding table (BIFT) 200 of a network node (e.g., network node 106). Each of the network nodes 104-118 in the BIER topology 100 in FIG. 1 derives a BIFT 200.

The BIFT 200 depicted in FIG. 2 is built on the network node 106 in FIG. 1. As shown, the BIFT 200 includes three columns of information. A first column 202 includes the BFR-id of each destination network node in the BIER topology 200. A second column 204 includes a forwarding bit mask (F-BM). A third column 206 in the BIFT 200 identifies the neighbor node (BFR-NBR) of the network node 106 used to reach the destination network node identified in the first column 202, which is why the neighbor node in the third column 206 may also be referred to as the next hop of the network node 106.

Because the destination network nodes with the BFR-id of 1, 2, and 4 in the first row 208, the second row 210, and the fourth row 214 in the BIFT 200 each have an SI of 0 and each have the same BFR-NBR of network node C, the F-BM for those rows is a combination of the bitstrings of the destination nodes with the BFR-id of 1, 2, and 4. In particular, a logical OR operation is applied to the bitstrings of the destination nodes with the BFR-id of 1, 2, and 4. A logical OR of the bitstrings 00001, 00010, and 01000 results in a F-BM of 01011 in the first row 208, the second row 210, and the fourth row 214 in the BIFT 200.

Because there are no other destination network nodes except for the destination network node E (a.k.a., network node 112) with the BFR-NBR of network node E, the F-BM in the third row 212 of the BIFT 200 is the same as the bitstring of the destination network node E, which is 00100.

Likewise, because there are no other destination network nodes except for the destination network node A (a.k.a., network node 104) with the BFR-NBR of network node A, the F-BM in the fifth row 216 of the BIFT 200 is the same as the bitstring of the destination network node A, which is 10000.

Figure 3:
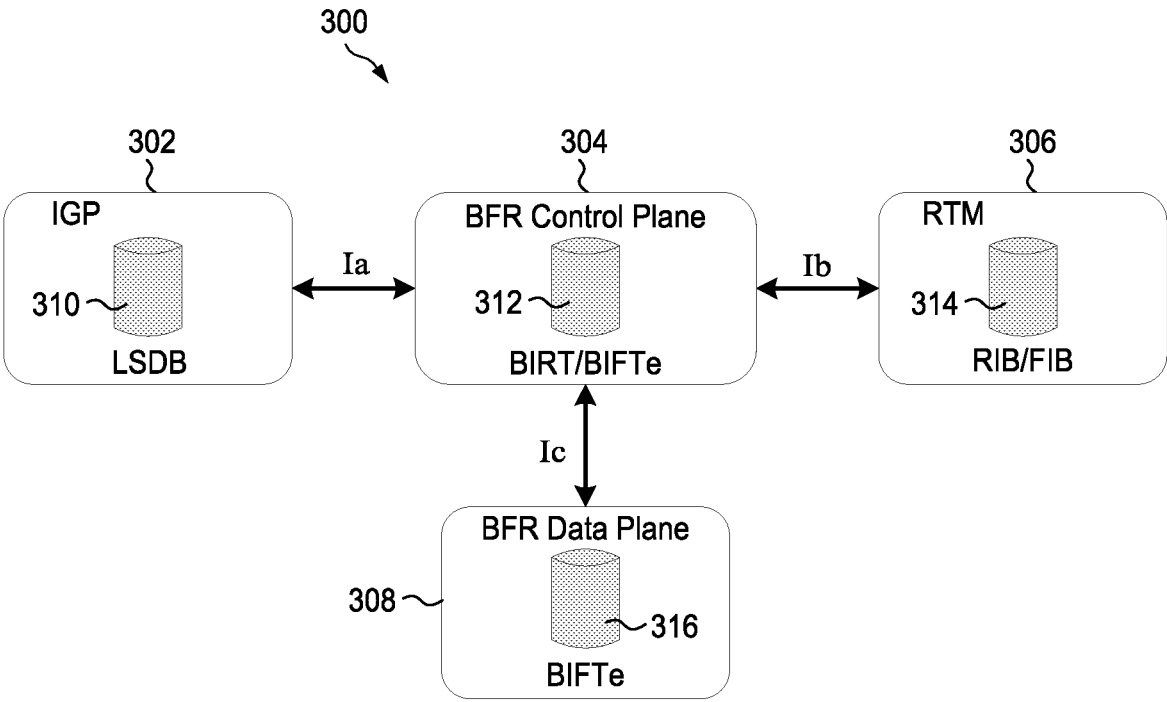
FIG. 3 is a schematic diagram of a reference architecture of a network node for BIER fast reroute (BIER-FRR) according to an embodiment of the disclosure.

FIG. 3 is a schematic diagram of a reference architecture of a network node for BIER fast reroute (BIER-FRR) 300 according to an embodiment of the disclosure. For the purpose of discussion, the reference architecture of FIG. 3 may be referred to herein as a distributed architecture. In an embodiment, the network node is one of the network nodes 104, 106, 108, 110, 112, 114, 116, and 118 in the BIER domain 102 of FIG. 1.

As shown in FIG. 3, the reference architecture of the network node for BIER-FRR 300 includes an interior gate way protocol (IGP) 302, a BFR control plane 304, a routing table manager (RTM) 306, and a BFR data plane 308. In an embodiment, the reference architecture of the network node for BIER-FRR 300 includes additional components in practical applications.

The IGP 302 includes a link state database (LSDB) 310 that contains the topology of the BIER domain 102. The LSDB 310 is built by a network node using information contained in link state announcements (LSAs) received from other network nodes in the BIER domain 102. The LSDB is synchronized between the network nodes within the same area (e.g., the BIER domain 102). In an embodiment, the network node uses the BIER topology in the LSDB 310 to compute a loop-free alternative (LFA) to each BEER to build the BIFTe. In an embodiment, the BIFTe comprises a fast reroute BIFT (FRR-BIFT) or an integrated BIFT.

The BFR control plane 304 includes a bit index routing table (BIRT)/enhanced BIFT (BIFTe) 312. The BIRT/BIFTe 312 stores the routing and/or forwarding entries generated by the network node. As shown, the BFR control plane 304 is coupled to the IGP 302 by way of the Ia interface. In an embodiment, the Ia interface is bi-directional. A control plane comprises software configured to manage or instruct a data plane. By contrast, the data plane is the part of the software that processes data requests. The data plane is also sometimes referred to as the forwarding plane.

The RTM 306 incudes a routing information base (RIB)/ forwarding information base (FIB) 314. The RIB/FIB 314 contains internet protocol (IP) loop-free alternates (IP-LFAs). The network node uses the IP-LFAs to build the BIFTe. In an embodiment, the network node builds the BIFTe when there is an IP-LFA of an expected type in the RIB/FIB 314. The expected type may be a basic LFA or a topology independent (TI) LFA. As shown, the RTM 306 is coupled to the BFR control plane 304 by way of the Ib interface. In an embodiment, the Ib interface is bi-directional.

The BFR data plane 308 includes a BIFTe 316. The BIFTe contains the forwarding entries built by the network node. As shown, the BFR data plane 308 is coupled to the BFR control plane 304 by way of the Ic interface. In an embodiment, the Ic interface is bi-directional. In an embodiment, the BFR control plane 304 sends the BIFTe to the BFR data plane 308. That is, the BFR data plane 308 receives the BIFTe from the BFR control plane 304.

In an embodiment, each network node in the BIER domain 102 of FIG. 1 builds its own BIFTe by utilizing the reference architecture of the network node for BIER-FRR 300 depicted in FIG. 3. For example, to develop a BIFTe (a.k.a., an LFA-based BIER-FRR), the BFR control plane 304 uses three interfaces in FIG. 3, namely Ia, Ib, and Ic.

Through interface Ib, the BFR control plane 304 obtains the IP LFAs in the RIB/FIB 314 built by the routing underlay. When an IP LFA is of an expected type, the BFR control plane 304 uses the IP LFA to build the BIFTe for the network node. Otherwise (i.e., when the IP LFA is not of an expected type), the BFR control plane 304 accesses the BIER network topology in the LSDB 310 through interface Ia to compute an LFA of the expected type and uses the LFA to build the BIFTe for the network node. The BIFTe provides a backup next hop to every BFER in the network domain 102. Thus, the BIFTe can be used to support BIER-FRR or BIER fast protection.

Through interface Ic, the control plane 304 updates the BIFTe 316 of the BFR data plane 308. The BFR data plane 308 then forwards packets (e.g., BIER packets, data packets) using the BIFTe to get around a failure in the BIER domain In an embodiment, the failure is the failure of a network node (e.g., network node 106), the failure of a link (e.g., link 120) coupling the network nodes, or a combination thereof.

Figure 4:
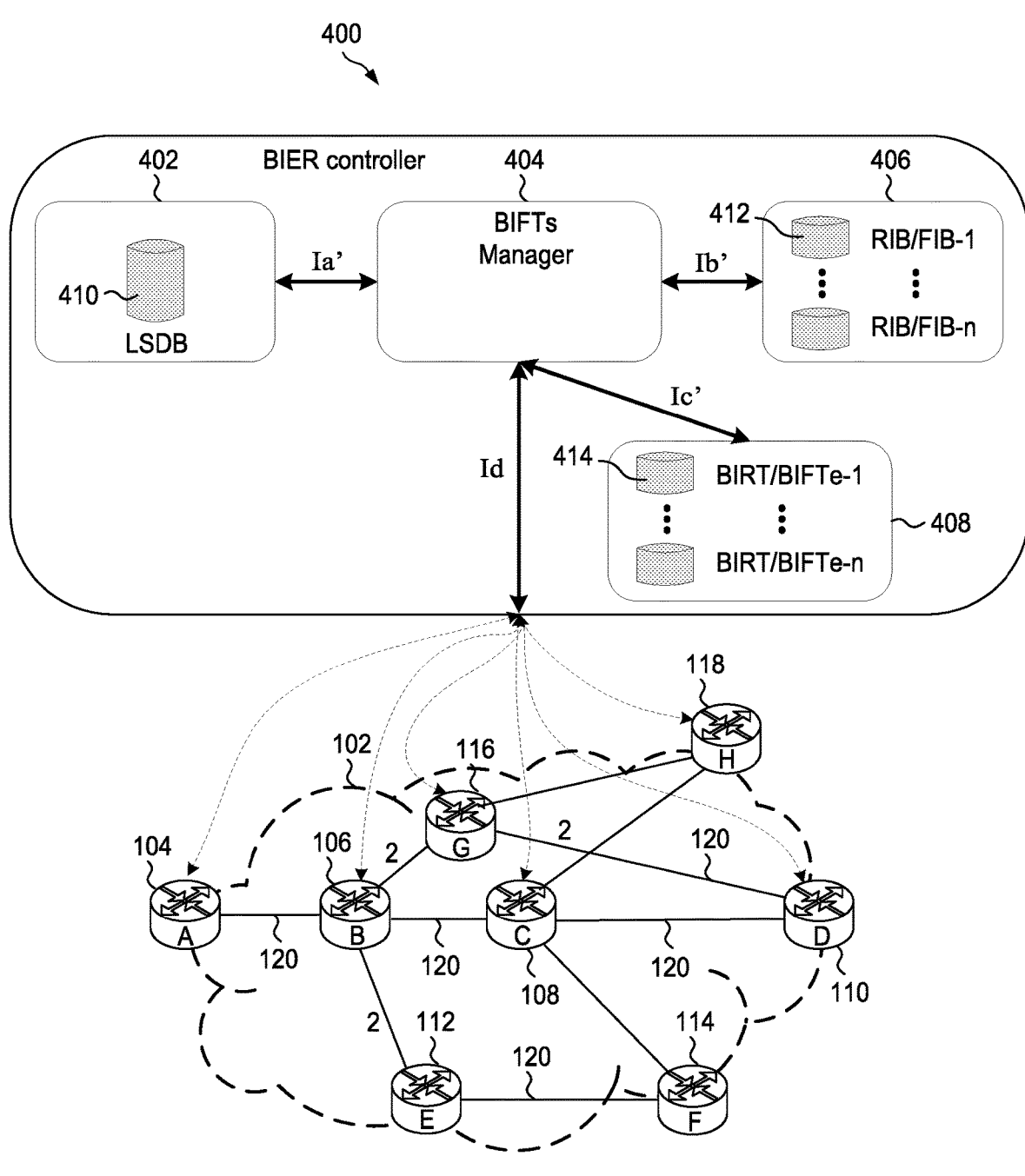
FIG. 4 is a schematic diagram of a reference architecture of a controller for BIER-FRR according to an embodiment of the disclosure.

FIG. 4 is a schematic diagram of a reference architecture of a controller for BIER-FRR 400 according to an embodiment of the disclosure. For the purpose of discussion, the reference architecture of FIG. 4 may be referred to herein as a centralized architecture. In an embodiment, the controller comprises controller 130 in FIG. 1. In an embodiment, the controller is one of the network nodes 104-118 in the BIER domain 102 of FIG. 1. In another embodiment, the controller is a network node other than the network nodes 104-118 in the BIER domain 102 of FIG. 1.

As shown in FIG. 4, the reference architecture of the controller for BIER-FRR 400 includes an interior gate way protocol (IGP) 402, a BIFTs manager 404, a RTM 406, and a storage unit 408. In an embodiment, the reference architecture of the controller for BIER-FRR 400 includes additional components in practical applications.

The BIFT manager 404 is configured to access the BIER topology in the LSDB 410 of the IGP 402 through interface Ia'. The BIFT manager 404 uses the BIER topology to compute an LFA of an expected type to each BEER for every network node (e.g., for every BFR-i up to n, where i is a positive integer representing one of the network nodes in the BIER domain 102 and where n represents the total number of the network nodes in the BIER domain 102).

The BIFT manager 404 is also configured to access an IP LFA to each BFER for every network node (e.g., BFR-i) from one of the RIB-i/FIB-i 412 in the RTM 406 through interface Ib' (where i is an integer from 1 to n). The BIFT manager 404 uses the IP-LFA to build a BIFTe-i for BFR-i when there is any IP-LFA of an expected type in the RIB-i/FIB-i 412. In an embodiment, the Ib' interface is bi-directional.

The BIFT manager 404 is also configured to store routing tables and/or forwarding tables in one of the BIRT-i/BIFTe-i 414 of the storage unit 408 through interface Ic' (where i is an integer from 1 to n). After being stored, the BIFT manager 404 may access, update, delete, etc., the routing and/or forwarding tables in the storage unit 408. In an embodiment, the Ic' interface is bi-directional.

The BIFT manager 404 is further configured to send the BIFTe-i for every BFR-i to the though interface Id. In an embodiment, the Id interface is bi-directional. As such, the BIFT manager 404 may receive information from one or more of the network nodes in the BIER domain 102 via the interface Id.

In an embodiment, the controller in the BIER domain 102 of FIG. 1 builds BIFTe-i (e.g., a BIFTe for each network node, i) by utilizing the reference architecture of the controller for BIER-FRR 400 depicted in FIG. 4. For example, to develop the BIFTe-i (a.k.a., an LFA-based BIER-FRR), the controller uses four interfaces: Ia', Ib', Ic' and Id, and every BFR-i control plane (e.g., control plane 304) uses two interfaces: Id and Ic. Through interface Ib', the controller obtains an IP LFA in the RIB-i or FIB-i 412 for BFR-i. When the IP LFA is of an expected type, the controller uses the IP LFA to build the BIFTe-i 414 for Otherwise (i.e., when the IP LFA is not of an expected type), the controller accesses the BIER network topology in the LSDB 410 through interface Ia' to compute an LFA of the expected type and uses the LFA to build the BIFTe-i 414 for BFR-i. The controller stores and/or updates the BIFTe-i 414 for BFR-i in 408 through interface Ic' while building the BIFTe-i 414 for BFR-i. Through interface Id, the controller sends the BIFTe-i 414 to BFR-i control plane 304 of the BFR-i (e.g., one of the network nodes 104-118 in the BIER domain 102).

In an embodiment, the BIFTe for a BFR comprises multiple FRR-BIFTs. A BFR has a FRR-BIFT for each of the BFR's BFR-NBR failures. For example, the network node 106 (a.k.a., network node B) has a FRR-BIFT used in case of a failure of the network node 116 (a.k.a., network node G), which may be referred to as a FRR-BIFT for G for short. The network node 106 also has a FRR-BIFT used in case of a failure of the network node 108 (a.k.a., network node C), which may be referred to as a FRR-BIFT for C for short. The network node 106 further has a FRR-BIFT used in case of a failure of the network node 112 (a.k.a., network node E) and a FRR-BIFT used in case of a failure of the network node 104 (a.k.a., network node A). The BFR forwards packets using the FRR-BIFT for X when X failed (e.g., network node B forwards packets using the FRR-BIFT for C when the network node C fails).

FIG. 5 is a schematic diagram of a FRR BIFT 500 of a network node according to an embodiment of the disclosure. Each of the network nodes 104-118 in the BIER topology 100 in FIG. 1 has a FRR-BIFT 500 for each of the BFR-NBRs of the network node.

The FRR-BIFT 500 depicted in FIG. 5 is the FRR-BIFT 500 of the network node 106 (a.k.a., the network node B) in FIG. 1 for the network node 108 (a.k.a., network node C or BFR-NBR 108) of the node 106 (a.k.a., network node B). As shown, the FRR-BIFT 500 includes four columns 502, 504, 506, 508 of information and five rows 510, 512, 514, 516, 518 of information. The first column 502 is the same as the first column 202 in the BIFT 200 of FIG. 2. A second column 504 and a third column 506 include an F-BM/backup F-BM (BF-BM) and a BFR-NBR/backup BFR-NBR (BBFR-NBR), respectively, that have been updated as noted below. A fourth column 508 includes a BBFR-NBR Type (BN-Type).

Referring to FIG. 2, the first row 208, the second row 210, and the fourth row 214 each identify the network node 108 (referred to herein as BFR-NBR C) in the third column 206 of the BIFT 200. Each instance of the BFR-NBR C is changed to a BBFR-NBR in the third column 506 of the FRR-BIFT 500 in FIG. 5. For example, the BFR-NBR C to the BFER with BFR-id 1 in the first row of the BIFT 200 is changed to the network node 116 (a.k.a., BBFR-NBR G) in the first row of the FRR-BIFT 500. The network node 116 is a topology independent (TI) LFA to the BFER. The BN-Type in the first row 510 of the FRR-BIFT 500 is set to TI and a pointer pointing a segment path from the network node 106 (a.k.a., the network node B) to the network node 116 (a.k.a., network node G). The segment path is from the network node B to the network node A to the network node G.

The BFR-NBR C to the BEER with BFR-id 2 in the second row 210 of the BIFT 200 is changed to the BBFR-NBR E in the second row 512 of the FRR-BIFT 500. Network node E is a normal LFA to the BFER. Therefore, the BN-Type in the second row 512 of the FRR-BIFT 500 is set to Normal.

The BFR-NBR C to the BFER with BFR-id 4 in the fourth row 214 of the BIFT 200 is changed to the BBFR-NBR G in the fourth row 516 of the FRR-BIFT 500. Node G is a TI LFA to the BFER. Therefore, the BN-Type in the fourth row 516 of the FRR-BIFT 500 is set to TI and a pointer pointing a segment path from the network node 106 (a.k.a., network node B) to the network node G. The segment path is from the network node B to the network node A to the network node G. The third row 514 and the fifth row 518 of the fourth column 508 in the FRR-BIFT 500 are blank.

Because the destination network nodes with the BFR-id of 1 and 4 in the first row 508 and the fourth row 514 in the FRR-BIFT 500 each have an SI of 0 and each have the same BFR-NBR/BBFR-NBR of network node G, the F-BM/BF-BM for those rows is a combination of the bitstrings of the destination nodes with the BFR-id of 1 and 4. In particular, a logical OR operation is applied to the bitstrings of the destination nodes with the BFR-id of 1 and 4. A logical OR of the bitstrings 00001 and 01000 results in an F-BM/BF-BM of 01001 in the first row 508 and the fourth row 514 in the FRR-BIFT 500.

Because the destination network nodes with the BFR-id of 2 and 3 in the second row 510 and the third row 512 in the FRR-BIFT 500 each have an SI of 0 and each have the same BFR-NBR/BBFR-NBR of network node E, the F-BM/BF-BM for those rows is a combination of the bitstrings of the destination nodes with the BFR-id of 2 and 3. In particular, a logical OR operation is applied to the bitstrings of the destination nodes with the BFR-id of 2 and 3. A logical OR of the bitstrings 00010 and 00100 results in an F-BM/BF-BM of 00110 in the second row 510 and the third row 512 in the FRR-BIFT 500.

Because there are no other destination network nodes except for the destination network node A (a.k.a., network node 104) with the BFR-NBR/BBFR-NBR of network node A, the F-BM/BF-BM in the fifth row 518 of the FRR-BIFT 500 is the same as the bitstring of the destination network node A, which is 10000. Once the FRR-BIFT 500 is derived as discussed above, a packet (e.g., a multicast packet, a BIER packet) can be routed in accordance with the FRR-BIFT 500 when the neighbor node C has failed.

FIG. 6 is a schematic diagram of an integrated BIFT 600 of a network node according to an embodiment of the disclosure. In an embodiment, the BIFTe for a BFR as discussed herein is an integrated BIFT 600 of the BFR. The integrated BIFT 600 combines a BIFT (e.g., BIFT 200) and FRR-BIFTs (e.g., FRR-BIFR 500) of the BFR. In an embodiment, each of the network nodes 104-118 in the BIER topology 100 in FIG. 1 has an integrated BIFT 600.

The integrated BIFT 600 depicted in FIG. 6 is the integrated BIFT 600 of the network node 106 (a.k.a., the network node B) in FIG. 1. As shown, the integrated BIFT 600 includes seven columns 602, 604, 606, 608, 610, 612, and 614 of information as well as five rows 616, 618, 620, 622, 624 of information. The first three columns 602, 604, and 606 are the same as the first three columns 202, 204, and 206 in the BIFT 200 of FIG. 2. The last three columns 610, 612, and 614 are obtained by combining the last three columns of multiple FRR-BIFTs of the network node B that have the BF-BM, BBFR-NBR, and BN-Type values.

For example, the first, second, and fourth rows 510, 512, 516 in FRR-BIFT 500 of the network node B for C have the BF-BM, BBFR-NBR, and BN-Type values. The last three columns 610, 612, and 614 of the first, second, and fourth rows 616, 618, and 622 in the BIFT 600 are the same as the last three columns 504, 506, 508 of the first, second, and fourth rows 510, 512, 516 in the FRR-BIFT 500.

The fourth column 608 includes a Backup Active (BA) flag. When a BFR-NBR fails, the BA flag in the row with the BFR-NBR is set to one to indicate that the last three columns 610, 612, 614 in the row are used to forward the packet with the BFER in the row.

In an embodiment, a number of protocol extensions used with the centralized architecture are discussed. The protocol extensions are implemented using type length values (TLVs) and sub-TLVs.

Figure 7:
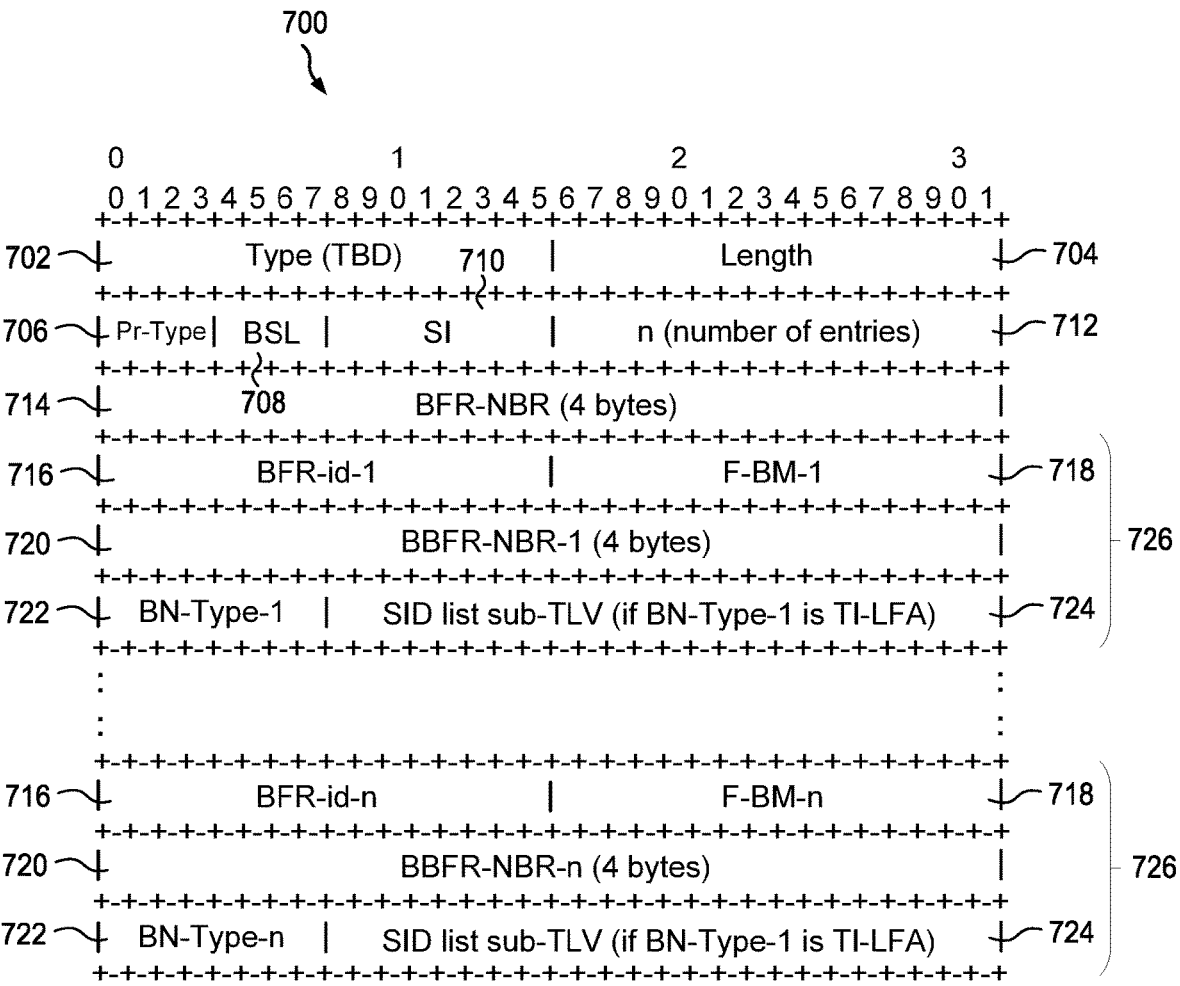
FIG. 7 is a schematic diagram of an Internet Protocol version 4 (IPv4) forwarding entries type length value (TLV) for the FRR BIFT according to an embodiment of the disclosure.

FIG. 7 is a schematic diagram of an Internet Protocol version 4 (IPv4) forwarding entries TLV 700 for the FRR BIFT according to an embodiment of the disclosure. In an embodiment, the TLV 700 is used for node protection. That is, the TLV 700 is used for protection upon failure of a network node. The IPv4 forwarding TLV 700 includes a type field 702, a length field 704, a protection type (Pr-type) field 706, a bitstring length (BSL) field 708, a set identifier (SI) field 710 (a.k.a., a site index field), a number of entries field 712, a BFR-NBR field 714, a BFR-id field 716, a F-BM field 718, a BBFR-NBR field 720, a BN type field 722, and a SID list sub-TLV field 724. The BFR-id field 716, the F-BM field 718, the BBFR-NBR field 720, the BN type field 722, and the SID list sub-TLV field 724 may be collectively referred to as the forwarding entry 726 (e.g., the forwarding entry for BFR-id-1, . . . the forwarding entry for BFR-id-n).

The type field 702 includes a value indicating the type of TLV 700. The value is to be determined (TBD). The length field 704 includes a value indicating a length of the TLV 700. The protection type field 706 includes a value indicating a protection type (e.g., value 1 for node protection and value 2 for link protection). The BSL field 708 includes a value indicating a length of the F-BM and the BF-BM. The SI field 710 includes a value indicating the SI (e.g., 0) of the BFR. The number of entries field 712 includes a value indicating the number of forwarding entries included in the TLV 700. The BFR-NBR field 714 is 4 bytes and includes a value indicating the failed BFR-NBR when the protection type is node protection and the failed link to the BFR-NBR when the protection type is link protection.

The BFR-id field 716 includes a value indicating a BFR-id (e.g., BFR-id-1, BFR-id-n). The F-BM field 718 includes a value indicating the F-BM. The BBFR-NBR field 720 is 4 bytes and includes a value indicating the BBFR-NBR. The BN-Type field 722 includes a value indicating the BN-type. The SID list sub-TLV field 724 includes a number of SIDs for a backup path to the BBFR-NBR when the BN-Type is TI-LFA.

Figure 8:
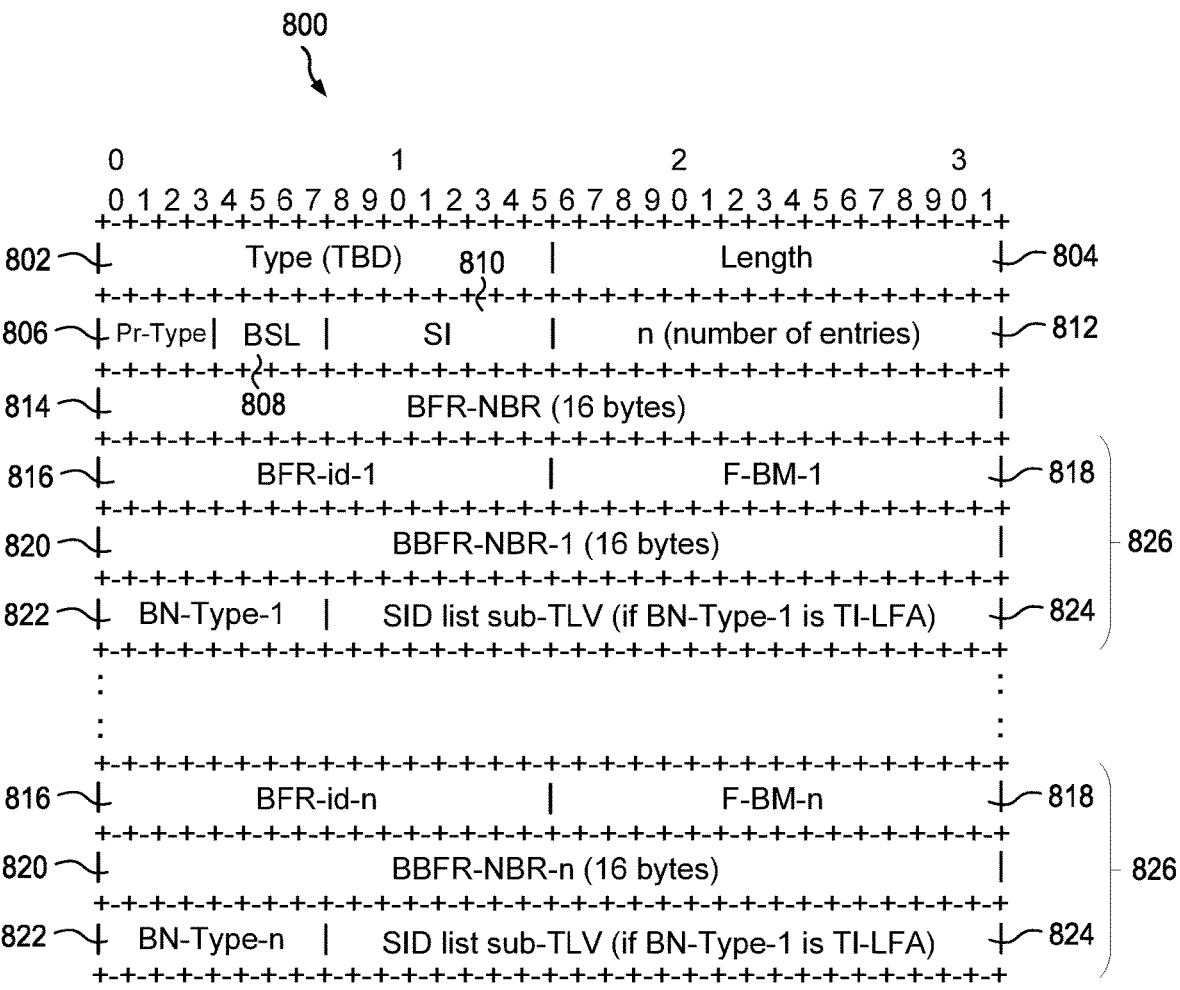
FIG. 8 is a schematic diagram of an Internet Protocol version 6 (IPv6) forwarding entries TLV for the FRR BIFT according to an embodiment of the disclosure.

FIG. 8 is a schematic diagram of an Internet Protocol version 6 (IPv6) forwarding entries TLV 800 for the FRR BIFT according to an embodiment of the disclosure. In an embodiment, the TLV 800 is used for node protection. That is, the TLV 700 is used for protection upon failure of a network node. The IPv6 forwarding TLV 800 includes a type field 802, a length field 804, a Pr-type field 806, a BSL field 808, an SI field 810, a number of entries field 812, a BFR-NBR field 814, a BFR-id field 816, a F-BM field 818, a BBFR-NBR field 820, a BN type field 822, and a SID list sub-TLV field 824. The BFR-id field 816, the F-BM field 818, the BBFR-NBR field 820, the BN type field 822, and the SID list sub-TLV field 824 may be collectively referred to as the forwarding entry 826 (e.g., the forwarding entry for BFR-id-1, the forwarding entry for BFR-id-n).

The type field 802 includes a value indicating the type of TLV 800. The value is to be determined (TBD). The length field 804 includes a value indicating a length of the TLV 800. The protection type field 806 includes a value indicating a protection type (e.g., value 1 indicating node protection and value 2 indicating link protection). The BSL field 808 includes a value indicating a length of the F-BM and the BF-BM. The SI field 810 includes a value indicating the SI (e.g., 0) of the BFR. The number of entries field 812 includes a value indicating the number of forwarding entries included in the TLV 800. The BFR-NBR field 814 is 16 bytes and includes a value indicating the failed BFR-NBR when the protection type is node protection and the failed link to the BFR-NBR when the protection type is link protection.

The BFR-id field 816 includes a value indicating a BFR-id (e.g., BFR-id-1, BFR-id-n). The F-BM field 818 includes a value indicating the F-BM. The BBFR-NBR field 820 is 16 bytes and includes a value indicating the BBFR-NBR. The BN-Type field 822 includes a value indicating the BN-type. The SID list sub-TLV field 824 includes a number of SIDs for a backup path to the BBFR-NBR when the BN-Type is TI-LFA.

Figure 9:
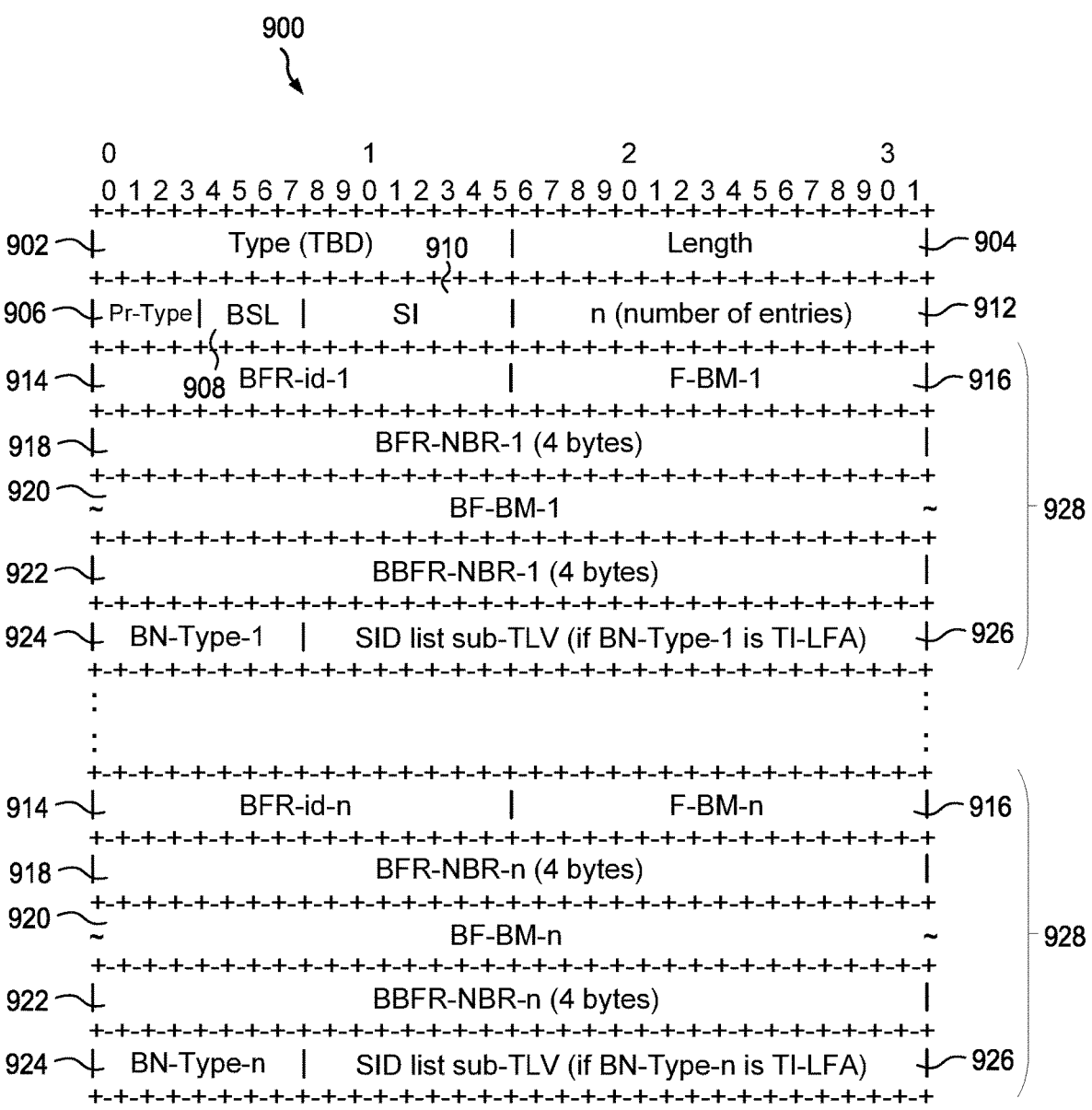
FIG. 9 is a schematic diagram of an IPv4 forwarding entries TLV for the integrated BIFT according to an embodiment of the disclosure.

FIG. 9 is a schematic diagram of an IPv4 forwarding entries TLV 900 for the integrated BIFT according to an embodiment of the disclosure. In an embodiment, the TLV 900 is used for link protection. That is, the TLV 900 is used for protection upon failure of a link. The IPv4 forwarding TLV 900 includes a type field 902, a length field 904, a Pr-type field 906, a BSL field 908, an SI field 910, a number of entries field 912, a BFR-id field 914, a F-BM field 916, a BFR-NBR field 918, a BF-BM field 920, a BBFR-NBR field 922, a BN type field 924, and a SID list sub-TLV field 926. The BFR-id field 914, the F-BM field 916, the BFR-NBR field 918, the BF-BM field 920, the BBFR-NBR field 922, the BN type field 924, and the SID list sub-TLV field 926 may be collectively referred to as the forwarding entry 928 (e.g., the forwarding entry for BFR-id-1, . . . the forwarding entry for BFR-id-n).

The type field 902 includes a value indicating the type of TLV 900. The value is to be determined (TBD). The length field 904 includes a value indicating a length of the TLV 900. The protection type field 906 includes a value indicating a protection type (e.g., value 1 indicating node protection and value 2 indicating link protection). The BSL field 908 includes a value indicating a length of the F-BM and the BF-BM. The SI field 910 includes a value indicating the SI (e.g., 0) of the BFR. The number of entries field 912 includes a value indicating the number of forwarding entries included in the TLV 900.

The BFR-id field 914 includes a value indicating a BFR-id (e.g., BFR-id-1, BFR-id-n). The F-BM field 916 includes a value indicating the F-BM. The BFR-NBR field 918 is 4 bytes and includes a value indicating the BFR-NBR. The BF-BM field 920 include a value indicating the BF-BM.

The BBFR-NBR field 922 is 4 bytes and includes a value indicating the BBFR-NBR. The BN-Type field 924 includes a value indicating the BN-type. The SID list sub-TLV field 926 includes a number of SIDs for a backup path to the BBFR-NBR when the BN-Type is TI-LFA.

Figure 10:
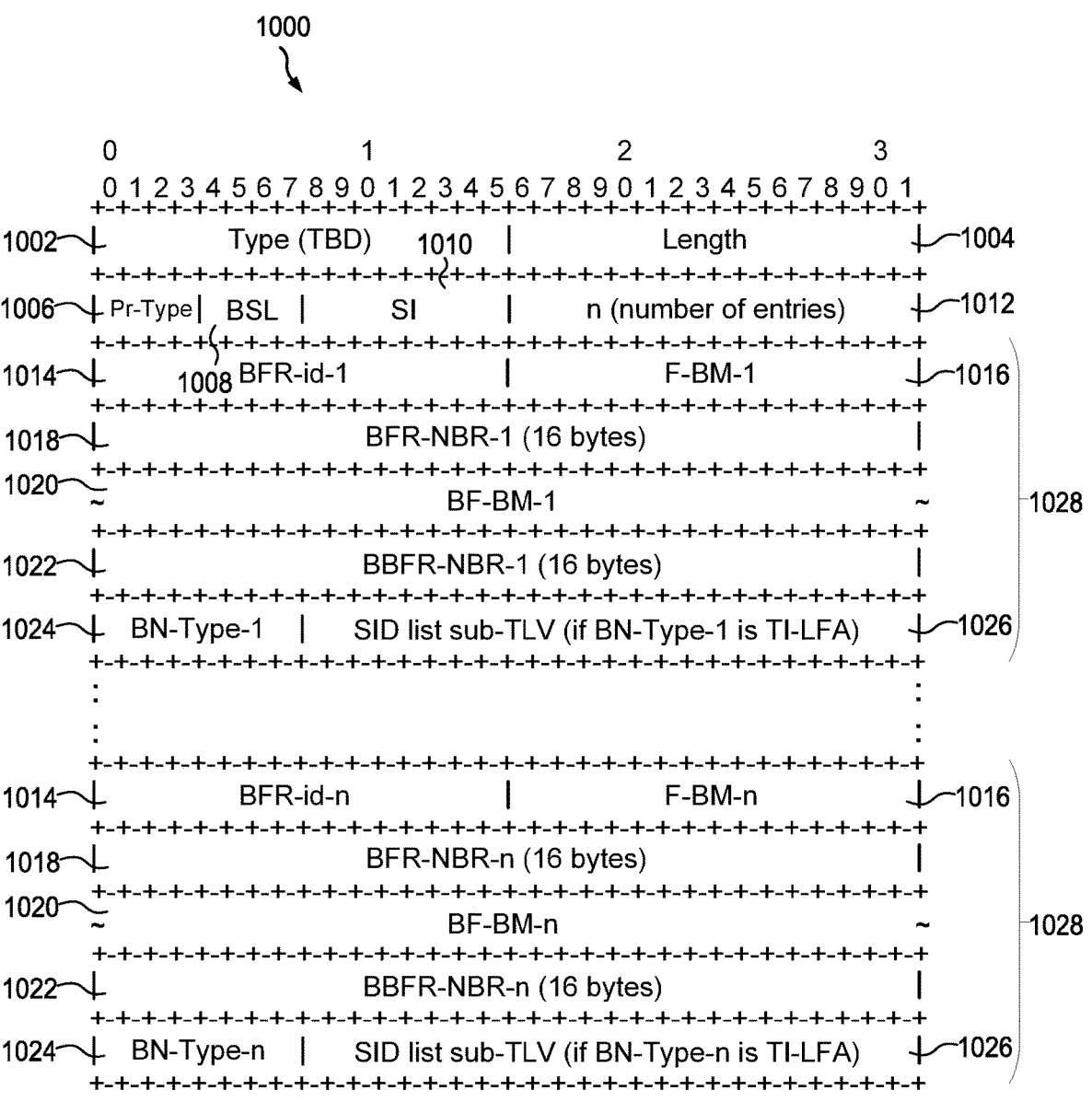
FIG. 10 is a schematic diagram of an IPv6 forwarding entries TLV for the integrated BIFT according to an embodiment of the disclosure.

FIG. 10 is a schematic diagram of an IPv6 forwarding entries TLV 1000 for the integrated BIFT according to an embodiment of the disclosure. In an embodiment, the TLV 1000 is used for link protection. That is, the TLV 1000 is used for protection upon failure of a link. The IPv4 forwarding TLV 1000 includes a type field 1002, a length field 1004, a Pr-type field 1006, a BSL field 1008, an SI field 1010, a number of entries field 1012, a BFR-id field 1014, a F-BM field 1016, a BFR-NBR field 1018, a BF-BM field 1020, a BBFR-NBR field 1022, a BN type field 1024, and a SID list sub-TLV field 1026. The BFR-id field 1014, the F-BM field 1016, the BFR-NBR field 1018, the BF-BM field 1020, the BBFR-NBR field 1022, the BN type field 1024, and the SID list sub-TLV field 1026 may be collectively referred to as the forwarding entry 1028 (e.g., the forwarding entry for BFR-id-1, . . . the forwarding entry for BFR-id-n).

The type field 1002 includes a value indicating the type of TLV 1000. The value is to be determined (TBD). The length field 1004 includes a value indicating a length of the TLV 1000. The protection type field 1006 includes a value indicating a protection type (e.g., value 1 indicating node protection and value 2 indicating link protection). The BSL field 1008 includes a value indicating a length of the F-BM and the BF-BM. The SI field 1010 includes a value indicating the SI (e.g., 0) of the BFR. The number of entries field 1012 includes a value indicating the number of forwarding entries included in the TLV 1000.

The BFR-id field 1014 includes a value indicating a BFR-id (e.g., BFR-id-1, BFR-id-n). The F-BM field 1016 includes a value indicating the F-BM. The BFR-NBR field 1018 is 16 bytes and includes a value indicating the BFR-NBR. The BF-BM field 1020 include a value indicating the BF-BM.

The BBFR-NBR field 1022 is 16 bytes and includes a value indicating the BBFR-NBR. The BN-Type field 1024 includes a value indicating the BN-type. The SID list sub-TLV field 1026 includes a number of SIDs for a backup path to the BBFR-NBR when the BN-Type is TI-LFA.

Figure 11:
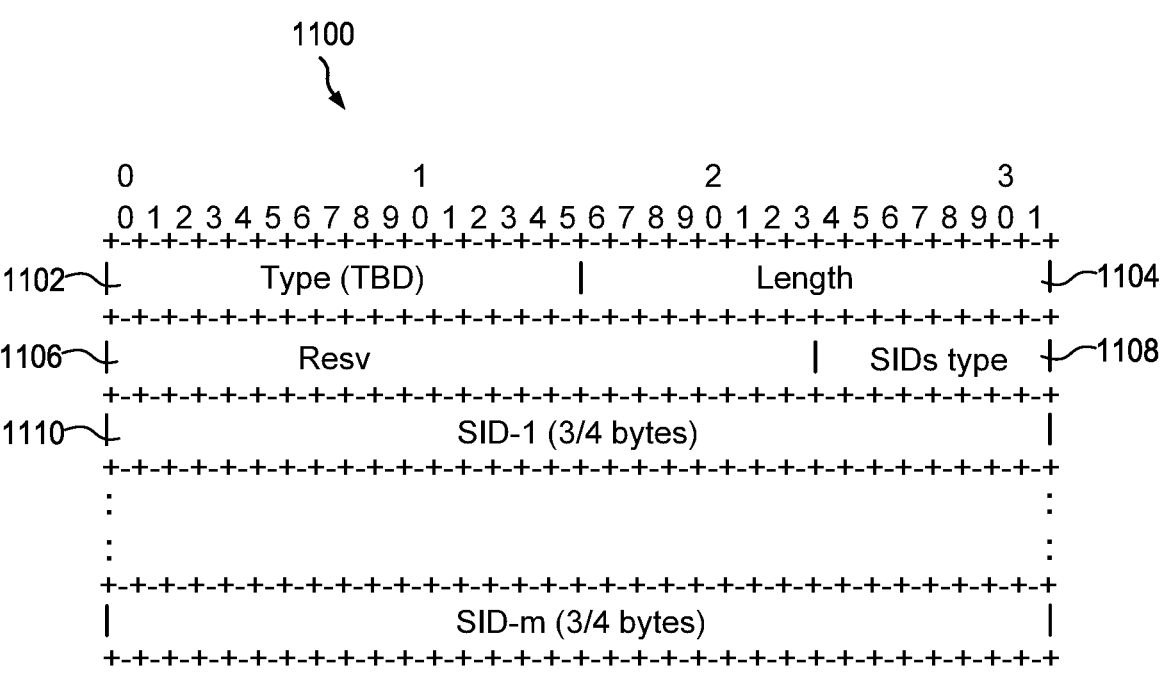
FIG. 11 is a schematic diagram of a segment identifier (SID) list sub-TLV for segment routing multiprotocol label switching (SR-MPLS) according to an embodiment of the disclosure.

FIG. 11 is a schematic diagram of a segment identifier (SID) list sub-TLV 1100 for segment routing multiprotocol label switching (SR-MPLS) according to an embodiment of the disclosure. The SID sub-TLV 1100 may be included in one of the SID list fields 724, 824, 926, and 1026 noted above. The SID sub-TLV 1100 includes a type field 1102, a length field 1104, a reserved field (Resv) 1106, an SIDs type field 1108, and one or more SIDs fields 1110.

The type field 1102 includes a value indicating the type of sub-TLV 1100. The value is to be determined (TBD). The length field 1104 includes a value indicating a length of the sub-TLV 1100. The reserved field 1106 is reserved for later use. The SIDs type field 1108 includes a value indicating a SIDs type (ST) in the TLV 1100. When the value is one, each of the SIDs in the SIDs field 1110 is a label, which is represented by the twenty (20) rightmost octets. When the value is two, each of the SIDs in the SIDs field 1110 is a 32-bit SID. Thus, the SIDs field 1100 may be either 3 or 4 bytes.

Figure 12:
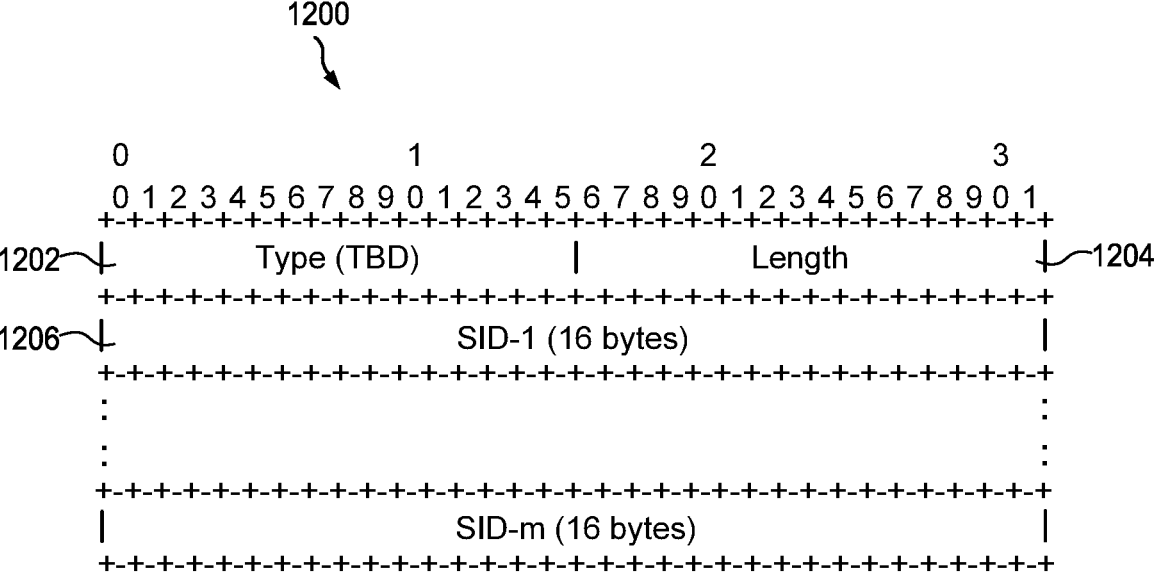
FIG. 12 is a schematic diagram of an SID list sub-TLV for segment routing over IPv6 (SRv6) according to an embodiment of the disclosure.

FIG. 12 is a schematic diagram of an SID list sub-TLV 1200 for segment routing over IPv6 (SRv6) according to an embodiment of the disclosure. The SID sub-TLV 1200 may be included in one of the SID list fields 724, 824, 926, and 1026 noted above. The SID sub-TLV 1200 includes a type field 1202, a length field 1204, and one or more SIDs fields 1206.

The type field 1202 includes a value indicating the type of sub-TLV 1200. The value is to be determined (TBD). The length field 1204 includes a value indicating a length of the sub-TLV 1200. Each of the SIDs in the SIDs field 1206 is a 128-bit value (i.e., 16 byte) SID (e.g., SRv6 SID).

FIG. 13 is a method 1300 implemented by a network node in the BIER domain according to an embodiment of the disclosure. The network node may be any of the network nodes 104-118 and the BIER domain may be the BIER domain 102. In an embodiment, the network node comprises a BFR or a BFER.

In block 1302, the control plane of the network node obtains an IP LFA from a FIB or a RIB through a first interface (e.g., Ib). The first interface is a wired or wireless communication channel that couples the control plane 304 and the RTM 306. In an embodiment, the IP-LFA is based on an IP network.

In block 1304, the control plane of the network node uses the IP LFA to build BIFTe when the IP LFA is an expected type. In an embodiment, the expected type comprises basic LFA or TI LFA. In block 1306, the control plane of the network node accesses a BIER network topology in a LSDB through a second interface (e.g., Ia), computes an LFA of the expected type, and uses the LFA to build the BIFTe when the IP LFA is not of the expected type. The second interface is a wired or wireless communication channel that couples the control plane 304 and the IGP 302. In an embodiment, the LFA is based on the BIER network topology.

In block 1308, the control plane of the network node updates the BIFTe in a data plane of the network node through a third interface (e.g., Ic). The third interface is a wired or wireless communication channel that couples the control plane 304 and the BFR data plane 308.

In block 1310, the data plane of the network node forwards BIER packets using the BIFTe to avoid a failure. In an embodiment, the failure comprises a neighbor network node failure in the BIER domain In an embodiment, the failure comprises a link failure in the BIER domain In an embodiment, the BIER packets are forwarded to a backup network node neighbor of the network node using the BIFTe.

FIG. 14 is a method 1400 implemented by a controller of the BIER domain according to an embodiment of the disclosure. The controller may be the controller 130 of the BIER domain 102. In an embodiment, the controller comprises a BIER controller.

In block 1402, the controller obtains an IP LFA for a network node from a FIB or a RIB through a first interface (e.g., Ib'). The first interface is a wired or wireless communication channel that couples the BIFT manager 404 and the RTM 406. In an embodiment, the network node comprises a BFR or a BFER.

In block 1404, the controller uses the IP LFA to build a BIFTe for the network node when the IP LFA is an expected type. In an embodiment, the IP-LFA is based on an IP network. In an embodiment, the expected type comprises a basic LFA or a TI LFA.

In block 1406, the controller accesses a BIER network topology in an LSDB through a second interface (e.g., Ia'), computes an LFA of the expected type, and uses the LFA to build the BIFTe for the network node when the IP LFA is not of the expected type. The second interface is a wired or wireless communication channel that couples the BIFT manager 404 and the IGP 402. In an embodiment, the LFA is based on the BIER network topology.

In block 1408, the controller sends the BIFTe for the network node to the network node through a third interface (e.g., Id). The third interface is a wired or wireless communication channel that couples the BIFT manager 404 to one or more of the network nodes 104-118. In an embodiment, the method 1400 is performed for every network node in the BIER domain.

In an embodiment, the BIFTe is sent to a control plane of the network node in a message comprising a TLV. In an embodiment, the TLV comprises a protection type, a BFR- NBR of the network node, and a forwarding entry for each BFER for forwarding a packet to avoid a failure of the BFR-NBR, and wherein the forwarding entry comprises a BFR-id of the BFER, a F-BM, a BBFR-NBR, a BN-Type, and a backup path when the BN-Type is the TI-LFA.

In an embodiment, the protection type has a value of one (1) to indicate node protection, and wherein the forwarding entry is used to forward the packet to avoid a failure of the BFR-NBR. In an embodiment, the protection type has a value of two (2) to indicate link protection, and wherein the forwarding entry is for forwarding the packet to avoid a failure of a link to the BFR-NBR.

In an embodiment, the TLV comprises a protection type and a BFER, and wherein the forwarding entry comprises a BFR-id of the BFER, a F-BM, a BBFR-NBR, a BF-BM, a BBFR-NBR, a BN-Type, and a backup path when the BN-Type is the TI-LFA.

In an embodiment, the protection type has a value of one (1) indicating node protection, and wherein the BFR-id of the BFER, a bit forwarding router neighbor (BFR-NBR) of the network node, the BF-BM, the BBFR-NBR, the BN-Type, and a backup path in the forwarding entry are used to forward the packet to avoid failure of the BFR-NBR. In an embodiment, the protection type has a value of two (2) indicating link protection, and wherein the BFR-id of the BFER, a bit forwarding router neighbor (BFR-NBR) of the network node (BFR-NBR), the BF-BM, the BBFR-NBR, the BN-Type, and a backup path in the forwarding entry are used to forward a packet to avoid a failure of a link to the BFR-NBR.

FIG. 15 is a schematic diagram of a network apparatus 1500 (e.g., a network node, a controller, a neighbor node, etc.). The network apparatus 1500 is suitable for implementing the disclosed embodiments as described herein. The network apparatus 1500 comprises ingress ports/ingress means 1510 and receiver units (Rx)/receiving means 1520 for receiving data; a processor, logic unit, or central processing unit (CPU)/processing means 1530 to process the data; transmitter units (Tx)/transmitting means 1540 and egress ports/egress means 1550 for transmitting the data; and a memory/memory means 1560 for storing the data. The network apparatus 1500 may also comprise optical-to-electrical (OE) components and electrical-to-optical (EO) components coupled to the ingress ports/ingress means 1510, the receiver units/receiving means 1520, the transmitter units/transmitting means 1540, and the egress ports/egress means 1550 for egress or ingress of optical or electrical signals.

The processor/processing means 1530 is implemented by hardware and software. The processor/processing means 1530 may be implemented as one or more CPU chips, cores (e.g., as a multi-core processor), field-programmable gate arrays (FPGAs), application specific integrated circuits (ASICs), and digital signal processors (DSPs). The processor/processing means 1530 is in communication with the ingress ports/ingress means 1510, receiver units/receiving means 1520, transmitter units/transmitting means 1540, egress ports/egress means 1550, and memory/memory means 1560. The processor/processing means 1530 comprises a BIER fast reroute module 1570. The BIER fast reroute module 1570 is able to implement the methods disclosed herein. The inclusion of the BIER fast reroute module 1570 therefore provides a substantial improvement to the functionality of the network apparatus 1500 and effects a transformation of the network apparatus 1500 to a different state. Alternatively, the BIER fast reroute module

1570 is implemented as instructions stored in the memory/memory means 1560 and executed by the processor/processing means 1530.

The network apparatus 1500 may also include input and/or output (I/O) or devices/I/O means 1580 for communicating data to and from a user. The I/O devices or I/O means 1580 may include output devices such as a display for displaying video data, speakers for outputting audio data, etc. The I/O devices or I/O means 1580 may also include input devices, such as a keyboard, mouse, trackball, etc., and/or corresponding interfaces for interacting with such output devices.

The memory/memory means 1560 comprises one or more disks, tape drives, and solid-state drives and may be used as an over-flow data storage device, to store programs when such programs are selected for execution, and to store instructions and data that are read during program execution. The memory/memory means 1560 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a network node in a Bit Index Explicit Replication (BIER) domain, comprising:
   obtaining, by a control plane of the network node, an internet protocol (IP) loop-free alternate (LFA) from a forwarding information base (FIB) or a routing information base (RIB) through a first interface;
   using, by the control plane of the network node, the IP LFA to build an enhanced bit index forwarding table (BIFTe) when the IP LFA is an expected type;
   accessing, by the control plane of the network node, a BIER network topology in a link state database (LSDB) through a second interface, computing an LFA of the expected type, and using the LFA to build the BIFTe when the IP LFA is not of the expected type;
   updating, by the control plane of the network node, the BIFTe in a data plane of the network node through a third interface; and
   forwarding, by the data plane of the network node, BIER packets using the BIFTe to avoid a failure.

2. The method of claim 1, wherein the network node comprises a bit forwarding router (BFR) or a bit forwarding egress router (BFER).

3. The method of claim 1, wherein the failure comprises a neighbor network node failure in the BIER domain or a link failure in the BIER domain.

4. The method of claim 1, wherein the IP LFA is based on an IP network, and wherein the LFA is based on the BIER network topology.

5. The method of claim 1, wherein the BIER packets are forwarded to a backup network node neighbor of the network node using the BIFTe.

6. The method of claim 1, wherein the expected type comprises a basic LFA or a topology independent (TI) LFA.

7. A network node in a Bit Index Explicit Replication (BIER) domain, comprising:

a memory storing instructions; and a processor coupled to the memory, the processor configured to execute the instructions to cause the network node to:

obtain, by a control plane of the network node, an internet protocol (IP) loop-free alternate (LFA) from a forwarding information base (FIB) or a routing information base (RIB) through a first interface;

use, by the control plane of the network node, the IP LFA to build an enhanced bit index forwarding table (BIFTe) when the IP LFA is an expected type;

access, by the control plane of the network node, a BIER network topology in a link state database (LSDB) through a second interface, compute an LFA of the expected type, and use the LFA to build the BIFTe when the IP LFA is not of the expected type;

update, by the control plane of the network node, the BIFTe in a data plane of the network node; and forward, by the data plane of the network node, BIER packets using the BIFTe to avoid a failure.

8. The network node of claim 7, wherein the network node comprises a bit forwarding router (BFR) or a bit forwarding egress router (BFER).

9. The network node of claim 7, wherein the failure comprises a neighbor network node failure in the BIER domain or a link failure in the BIER domain.

10. The network node of claim 7, wherein the IP LFA is based on an IP network, and wherein the LFA is based on the BIER network topology.

11. The network node of claim 7, wherein the BIER packets are forwarded to a backup network node neighbor of the network node using the BIFTe.

12. The network node of claim 7, wherein the expected type comprises a basic LFA or a topology independent (TI) LFA.

13. A method implemented by a controller of a Bit Index Explicit Replication (BIER) domain, comprising:

obtaining an internet protocol (IP) loop-free alternate (LFA) for a network node from a forwarding information base (FIB) or a routing information base (RIB) through a first interface;

using the IP LFA to build an enhanced bit index forwarding table (BIFTe) for the network node when the IP LFA is an expected type;

accessing a BIER network topology in a link state database (LSDB) through a second interface, computing an LFA of the expected type, and using the LFA to build the BIFTe for the network node when the IP LFA is not of the expected type; and sending the BIFTe for the network node to the network node through a third interface.

14. The method of claim 13, wherein the network node comprises a bit forwarding router (BFR) or a bit forwarding egress router (BFER).

15. The method of claim 14, wherein the method is performed for every network node in the BIER domain.

16. The method of claim 14, wherein the IP LFA is based on an IP network, and wherein the LFA is based on the BIER network topology.

17. The method of claim 14, wherein the expected type comprises a basic LFA or a topology independent (TI) LFA.

18. The method of claim 13, wherein the BIFTe is sent to a control plane of the network node in a message comprising a Type-Length-Value (TLV).

19. The method of claim 18, wherein the TLV comprises a protection type, a bit forwarding router neighbor (BFR-NBR) of the network node, and a forwarding entry for each bit forwarding egress router (BFER) for forwarding a packet to avoid a failure of the BFR-NBR, and wherein the forwarding entry comprises a BFR identifier (BFR-id) of the BFER, a forwarding bit mask (F-BM), a backup BFR-NBR (BBFR-NBR), a BBFR-NBR Type (BN-Type), and a backup path when the BN-Type is a topology independent (TI) LFA.

20. The method of claim 19, wherein the protection type has a value of one (1) to indicate node protection, and wherein the forwarding entry is used to forward the packet to avoid the failure of the BFR-NBR.

21. The method of claim 19, wherein the protection type has a value of two (2) to indicate link protection, and wherein the forwarding entry is for forwarding the packet to avoid a failure of a link to the BFR-NBR.

22. The method of claim 18, wherein the TLV comprises a protection type and a forwarding entry for each bit forwarding egress router (BFER), and wherein the forwarding entry comprises a BFR identifier (BFR-id) of the BFER, a forwarding bit mask (F-BM), a BFR-NBR, a backup forwarding bit mask (BF-BM), a backup BFR-NBR (BBFR-NBR), a BBFR-NBR Type (BN-Type), and a backup path when the BN-Type is a topology independent (TI) LFA.

23. The method of claim 22, wherein the protection type has a value of one (1) indicating node protection, and wherein the BFR-id of the BFER, a bit forwarding router neighbor (BFR-NBR) of the network node, the BF-BM, the BBFR-NBR, the BN-Type, and a backup path in the forwarding entry are used to forward a packet to avoid failure of the BFR-NBR.

24. The method of claim 22, wherein the protection type has a value of two (2) indicating link protection, and wherein the BFR-id of the BFER, a bit forwarding router neighbor (BFR-NBR) of the network node (BFR-NBR), the BF-BM, the BBFR-NBR, the BN-Type, and a backup path in the forwarding entry are used to forward a packet to avoid a failure of a link to the BFR-NBR.

* * * * *